US012640092B2

(12) United States Patent
Yuan et al.

(10) Patent No.: US 12,640,092 B2
(45) Date of Patent: May 26, 2026

(54) DISPLAY SUBSTRATE AND DISPLAY DEVICE

(71) Applicants: HEFEI BOE JOINT TECHNOLOGY CO., LTD., Hefei (CN); BOE TECHNOLOGY GROUP CO., LTD., Beijing (CN)

(72) Inventors: Zhidong Yuan, Beijing (CN); Can Yuan, Beijing (CN); Dacheng Zhang, Beijing (CN); Yongqian Li, Beijing (CN)

(73) Assignees: HEFEI BOE JOINT TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/555,023

(22) PCT Filed: Jan. 12, 2023

(86) PCT No.: PCT/CN2023/071888
§ 371 (c)(1),
(2) Date: Oct. 12, 2023

(87) PCT Pub. No.: WO2024/087401
PCT Pub. Date: May 2, 2024

(65) Prior Publication Data

US 2025/0095571 A1 Mar. 20, 2025

(30) Foreign Application Priority Data

Oct. 28, 2022 (WO) ................ PCT/CN2022/128241
Oct. 28, 2022 (WO) ................ PCT/CN2022/128244
Oct. 28, 2022 (WO) ................ PCT/CN2022/128272

(51) Int. Cl.
*G09G 3/3233* (2016.01)
*G09G 3/3208* (2016.01)
*G09G 3/3258* (2016.01)

(52) U.S. Cl.
CPC ......... *G09G 3/3233* (2013.01); *G09G 3/3208* (2013.01); *G09G 3/3258* (2013.01);
(Continued)

(58) Field of Classification Search
CPC ......... G09G 3/3233; G09G 2300/0426; G09G 2330/021
See application file for complete search history.

(56) References Cited

U.S. PATENT DOCUMENTS 11,074,864 B1 7/2021 Lu et al.
11,804,181 B2 10/2023 Cho et al.
(Continued)

FOREIGN PATENT DOCUMENTS

CN 101630479 A 1/2010
CN 102842283 A 12/2012
(Continued)

OTHER PUBLICATIONS

Chang Tianhai et al., Study on The Display Apparatus of OLED's Driving Circuit, Guangdong Vacuum Society 2011 pp. 71-76.
(Continued)

*Primary Examiner* — Adam R. Giesy
(74) *Attorney, Agent, or Firm* — Dilworth & Barrese, LLP.; Michael J. Musella, Esq.

(57) ABSTRACT

A display substrate and a display device are disclosed, the display substrate has a plurality of display partitions arranged in a plurality of rows and columns, and at least one display partition includes a plurality of sub-pixels; the display substrate includes a base substrate and common scanning signal lines, the common scanning signal lines are
(Continued)

provided on the base substrate, and include a plurality of first common scanning signal lines extending along a first direction and a plurality of second common scanning signal lines extending along a second direction, and the first direction is different from the second direction; each of the plurality of second common scanning signal lines is electrically connected to one first common scanning signal line, and is configured to provide a common scanning signal to one display partition.

20 Claims, 11 Drawing Sheets

(52) U.S. Cl.
CPC ............... *G09G 2300/0426* (2013.01); *G09G 2300/0804* (2013.01); *G09G 2300/0819* (2013.01); *G09G 2300/0852* (2013.01); *G09G 2300/0861* (2013.01); *G09G 2310/08* (2013.01); *G09G 2320/0204* (2013.01); *G09G 2320/0233* (2013.01); *G09G 2320/043* (2013.01); *G09G 2320/045* (2013.01); *G09G 2330/021* (2013.01)

(56) References Cited

U.S. PATENT DOCUMENTS

| | | | | |
|---|---|---|---|---|
| 2011/0266535 | A1 | 11/2011 | Li et al. | |
| 2015/0115292 | A1 | 4/2015 | Jeon et al. | |
| 2018/0261627 | A1* | 9/2018 | An | G09G 3/36 |
| 2018/0357964 | A1 | 12/2018 | Shin et al. | |
| 2019/0051243 | A1 | 2/2019 | Li et al. | |
| 2020/0234649 | A1 | 7/2020 | Fan et al. | |
| 2021/0057450 | A1* | 2/2021 | Wu | G09G 3/3275 |
| 2021/0091161 | A1 | 3/2021 | Baek et al. | |
| 2021/0183977 | A1 | 6/2021 | Xiao et al. | |
| 2021/0257440 | A1 | 8/2021 | Long et al. | |
| 2021/0272517 | A1 | 9/2021 | Chen et al. | |
| 2021/0328002 | A1 | 10/2021 | Lee et al. | |
| 2022/0068182 | A1* | 3/2022 | Lee | G09G 3/20 |
| 2022/0157856 | A1 | 5/2022 | Choung et al. | |
| 2022/0165217 | A1 | 5/2022 | Lee et al. | |
| 2022/0246086 | A1 | 8/2022 | Son et al. | |
| 2023/0005421 | A1 | 1/2023 | Sakaguchi et al. | |
| 2023/0021680 | A1 | 1/2023 | Li et al. | |
| 2023/0196975 | A1 | 6/2023 | Zong et al. | |
| 2023/0298381 | A1 | 9/2023 | Xu et al. | |
| 2023/0410759 | A1 | 12/2023 | Zong et al. | |

FOREIGN PATENT DOCUMENTS

| | | | |
|---|---|---|---|
| CN | 103035195 | A | 4/2013 |
| CN | 103943067 | A | 7/2014 |
| CN | 105845081 | A | 8/2016 |
| CN | 106157896 | A | 11/2016 |
| CN | 106782339 | A | 5/2017 |
| CN | 108986749 | A | 12/2018 |
| CN | 109166896 | A | 1/2019 |
| CN | 109817157 | A | 5/2019 |
| CN | 110111738 | A | 8/2019 |
| CN | 209729911 | U | 12/2019 |
| CN | 111540771 | A | 8/2020 |
| CN | 111599846 | A | 8/2020 |
| CN | 112071882 | A | 12/2020 |
| CN | 112542437 | A | 3/2021 |
| CN | 112713157 | A | 4/2021 |
| CN | 113540172 | A | 10/2021 |
| CN | 113675252 | A | 11/2021 |
| CN | 114120905 | A | 3/2022 |
| CN | 114241996 | A | 3/2022 |
| CN | 114255704 | A | 3/2022 |
| CN | 114497143 | A | 5/2022 |
| CN | 114582288 | A | 6/2022 |
| CN | 114725181 | A | 7/2022 |
| CN | 114746932 | A | 7/2022 |
| CN | 115023755 | A | 9/2022 |
| CN | 115087956 | A | 9/2022 |
| JP | 2009288748 | A | 12/2009 |
| WO | 2019024395 | A1 | 2/2019 |

OTHER PUBLICATIONS

US First Office Action in U.S. Appl. No. 18/558,500; Mailing Date: Apr. 18, 2025.

Extended European Search Report for Application No. 22963155.1; Mailing Date: Apr. 7, 2025.

Extended European Search Report from Application No. 23881007.1; Mailing Date: Jul. 9, 2025.

US Office Action from U.S. Appl. No. 18/558,248; Mailing Date: Feb. 5, 2026.

* cited by examiner

DISPLAY SUBSTRATE AND DISPLAY DEVICE

CROSS-REFERENCE TO RELATED APPLICATIONS

The present application claims the priority PCT application No. PCT/CN2023/071888 filed on Jan. 12, 2023, the priority to to PCT application No. PCT/CN2022/128241 filed on Oct. 28, 2022, the priority to PCT application No. PCT/CN2022/128244 filed on Oct. 28, 2022, and the priority to PCT application No. PCT/CN2022/128272 filed on Oct. 28, 2022, and the disclosures of the PCT applications are hereby incorporated by reference in their entirety as a part of the present application for all purposes.

TECHNICAL FIELD

Embodiments of the present disclosure relate to a display substrate and a display device.

BACKGROUND

With the continuous development of display technology, the application range of display products is becoming wider and wider, and display products with high resolution and high refresh rate are more and more popular. Due to the limitation of large load, medium-sized and large-sized display products cannot well realize the product function of high refresh frequency.

SUMMARY

At least one embodiment of the present disclosure provides a display substrate, the display substrate comprises a plurality of display partitions arranged in a plurality of rows and columns, at least one of the plurality of display partitions comprises a plurality of sub-pixels, and the display substrate comprises: a base substrate; and common scanning signal lines, the common scanning signal lines are on the base substrate and comprise a plurality of first common scanning signal lines extending along a first direction and a plurality of second common scanning signal lines extending along a second direction, the first direction is different from the second direction, and each of the plurality of second common scanning signal lines is electrically connected to one first common scanning signal line of the plurality of first common scanning signal lines, and is configured to provide a common scanning signal to one display partition of the plurality of display partitions.

For example, in the display substrate provided by at least one embodiment of the present disclosure, the plurality of first common scanning signal lines and the plurality of second common scanning signal lines are provided in different layers, and have a first overlapping portion in a direction perpendicular to the base substrate; the display substrate further comprises an auxiliary electrode provided on a side of the plurality of first common scanning signal lines and the plurality of second common scanning signal lines away from the base substrate; and in the direction perpendicular to the base substrate, the auxiliary electrode overlaps with the first overlapping portion.

For example, in the display substrate provided by at least one embodiment of the present disclosure, the sub-pixel comprises a pixel driving circuit and a light-emitting device electrically connected to the pixel driving circuit; the light-emitting device comprises a first electrode electrically connected to the pixel driving circuit, a light-emitting material layer on a side of the first electrode away from the base substrate, and a second electrode on a side of the light-emitting material layer away from the base substrate; and the auxiliary electrode is provided in a same layer as the first electrode, and is electrically connected to the second electrode.

For example, in the display substrate provided by at least one embodiment of the present disclosure, the pixel driving circuit comprises a first transistor, the first transistor comprises a first gate electrode, a first source electrode and a first drain electrode; and the plurality of first common scanning signal lines and the first gate electrode are provided in a same layer, and the first gate electrode is electrically connected to one of the plurality of second common scanning signal lines.

For example, the display substrate provided by at least one embodiment of the present disclosure further comprises: a plurality of data lines and a plurality of first power supply lines, the plurality of data lines respectively extend along the first direction and are configured to provide data signals to the plurality of sub-pixels; and the plurality of first power supply lines respectively extend along the first direction and are configured to provide first power supply signals to the plurality of sub-pixels, an orthographic projection of at least part of at least one of the plurality of first common scanning signal lines on the base substrate is between orthographic projections of one data line and one first power supply line, which are adjacent to each other, on the base substrate; and at least one of the plurality of first power supply lines is electrically connected to the auxiliary electrode.

For example, the display substrate provided by at least one embodiment of the present disclosure further comprises: a plurality of second power supply lines, respectively extending along the first direction and configured to provide second power supply signals to the plurality of sub-pixels, a potential of the second power supply signal is higher than a potential of the first power supply signal; and the plurality of first power supply lines and the plurality of second power supply lines are provided in a same layer and provided alternately along the second direction.

For example, in the display substrate provided by at least one embodiment of the present disclosure, the plurality of data lines and the plurality of first power supply lines are provided in a same layer, and are provided on a side of the first drain electrode away from the base substrate.

For example, in the display substrate provided by at least one embodiment of the present disclosure, the plurality of sub-pixels comprise a plurality of repeating units arranged in an array, and each of the plurality of repeating units comprises a plurality of sub-pixels emitting light of different colors; and an orthographic projection of at least part of at least one of the plurality of first common scanning signal lines on the base substrate is between orthographic projections of pixel driving circuits of adjacent repeating units on the base substrate.

For example, in the display substrate provided by at least one embodiment of the present disclosure, the plurality of sub-pixels comprise a red sub-pixel, a green sub-pixel and a blue sub-pixel, and an orthographic projection of at least part of at least one of the plurality of first common scanning signal lines on the base substrate is between an orthographic projection of one data line, which provides a data signal to the blue sub-pixel, on the base substrate and an orthographic projection of one first power supply line, which is adjacent to the one data line providing the data signal to the blue sub-pixel, on the base substrate.

For example, in the display substrate provided by at least one embodiment of the present disclosure, the pixel driving circuit further comprises a second transistor, and the second transistor comprises a second gate electrode, and a source electrode and a drain electrode that are on a side of the second gate electrode away from the base substrate; the display substrate further comprises a plurality of first scanning signal lines; the second gate electrode is electrically connected to one of the plurality of first scanning signal lines; the second source electrode is electrically connected to one of the plurality of data lines; and the second drain electrode is electrically connected to the first source electrode.

For example, in the display substrate provided by at least one embodiment of the present disclosure, the pixel driving circuit further comprises a first capacitor, and the first capacitor comprises a first capacitor electrode and a second capacitor electrode; the first capacitor electrode is electrically connected to the first drain electrode, and the second capacitor electrode is electrically connected to the first electrode; and the first capacitor electrode comprises a first portion in a same layer as the first gate electrode and a second portion in a same layer as the first drain electrode.

For example, in the display substrate provided by at least one embodiment of the present disclosure, an orthographic projection of at least one of the plurality of second common scanning signal lines on the base substrate is between an orthographic projection of one first scanning signal line on the base substrate and an orthographic projection of the first capacitor electrode, which is adjacent to the one first scanning signal line, on the base substrate.

For example, in the display substrate provided by at least one embodiment of the present disclosure, the pixel driving circuit further comprises a first shared transistor, and the first shared transistor is shared by at least two adjacent sub-pixels; the first shared transistor comprises a first shared gate electrode, and a first shared source electrode and a first shared drain electrode that are on a side of the first shared gate electrode away from the base substrate; and the first shared gate electrode is electrically connected to one of the plurality of first common scanning signal lines.

For example, in the display substrate provided by at least one embodiment of the present disclosure, the first shared transistor further comprises a first shared active layer, the plurality of sub-pixels comprise a plurality of repeating units arranged in an array, and each of the plurality of repeating units comprises a plurality of sub-pixels emitting light of different colors; and an orthographic projection of the first shared active layer on the base substrate is between orthographic projections of pixel driving circuits of adjacent repeating units on the base substrate.

For example, in the display substrate provided by at least one embodiment of the present disclosure, in a direction perpendicular to the base substrate, one of the plurality of first common scanning signal lines has a second overlapping portion overlapping with the first shared active layer, and the second overlapping portion is served as the first shared gate electrode.

For example, in the display substrate provided by at least one embodiment of the present disclosure, the plurality of sub-pixels comprise a red sub-pixel, a green sub-pixel and a blue sub-pixel, and taking one red sub-pixel, one green sub-pixel and one blue sub-pixel as a repeating unit, the first shared transistor is shared by at least two adjacent repeating units.

For example, in the display substrate provided by at least one embodiment of the present disclosure, intervals are provided between a plurality of second common scanning signal lines in a same row.

For example, in the display substrate provided by at least one embodiment of the present disclosure, the plurality of first common scanning signal lines and the plurality of second common scanning signal lines are in a same layer, and are in a same layer as the first gate electrode.

For example, in the display substrate provided by at least one embodiment of the present disclosure, each display partition is correspondingly provided with at least one reset voltage line, one first common scanning signal line and one reference voltage line, and the at least one reset voltage line, the one first common scanning signal line and the one reference voltage line are respectively between different sub-pixels.

For example, in the display substrate provided by at least one embodiment of the present disclosure, the plurality of sub-pixels comprise a plurality of repeating units arranged in an array, at least one of the plurality of repeating units comprises a red sub-pixel, a green sub-pixel and a blue sub-pixel, an orthographic projection of a first electrode of a light-emitting device of the red sub-pixel on the base substrate at least partially overlaps with orthographic projections of one data line and one reference voltage line on the base substrate; an orthographic projection of a first electrode of a light-emitting device of the blue sub-pixel on the base substrate at least partially overlaps with an orthographic projection of one data line on the base substrate; and an orthographic projection of a first electrode of a light-emitting device of the green sub-pixel on the base substrate at least partially overlaps with orthographic projections of one data line and one first power supply line on the base substrate.

For example, in the display substrate provided by at least one embodiment of the present disclosure, the plurality of sub-pixels comprise a plurality of repeating units arranged in an array, and each of the plurality of repeating units comprises a red sub-pixel, a green sub-pixel and a blue sub-pixel pixel; and an orthographic projection of at least one of the plurality of first common scanning signal lines on the base substrate is between an orthographic projection of one data line, which provides a data signal to the blue sub-pixel, on the base substrate and an orthographic projection of one data line, which provides a data signal to the green sub-pixel and is adjacent to the one data line providing the data signal to the blue sub-pixel, on the base substrate.

For example, in the display substrate provided by at least one embodiment of the present disclosure, the sub-pixel comprises a pixel driving circuit and a light-emitting device electrically connected to the pixel driving circuit, and the pixel driving circuit comprises a first transistor, a second transistor, a third transistor, a fourth transistor, a fifth transistor, a sixth transistor, a first shared transistor and a first capacitor; the first transistor comprises a first gate electrode, a first source electrode and a first drain electrode, and the first gate electrode is electrically connected to the second common scanning signal line; the second transistor comprises a second gate electrode, a second source electrode and a second drain electrode, the second gate electrode is electrically connected to a first scanning signal line, the second source electrode is electrically connected to a data line, and the second drain electrode is electrically connected to the first source electrode; the third transistor comprises a third gate electrode, a third source electrode and a third drain electrode, and the third gate electrode is electrically connected to a third scanning signal line; the fourth transistor comprises a fourth gate electrode, a fourth source electrode and a fourth drain electrode, the fourth gate electrode is electrically connected to a second scanning signal line, the fourth source electrode is electrically connected to the first source electrode and the second drain electrode, and the fourth drain electrode is electrically connected to a reference voltage line; the fifth transistor comprises a fifth gate electrode, a fifth source electrode and a fifth drain electrode, the fifth gate electrode is electrically connected to a light-emitting control signal line, and the fifth drain electrode is electrically connected to a second power supply line; the first shared transistor comprises a first shared gate electrode, a first shared source electrode and a first shared drain electrode, the first shared gate electrode is electrically connected to the first common scanning signal line, the first shared source electrode is electrically connected to a reset voltage line, and the first shared drain electrode is electrically connected to the third drain electrode; the sixth transistor comprises a sixth gate electrode, a sixth source electrode and a sixth drain electrode, the sixth gate electrode is electrically connected to the first drain electrode, the sixth source electrode is electrically connected to a first electrode of the light-emitting device, and the sixth drain electrode is electrically connected to the fifth source electrode and the third source electrode; and the first capacitor comprises a first capacitor electrode and a second capacitor electrode, the first capacitor electrode is electrically connected to the first drain electrode, and the second capacitor electrode is electrically connected to the first electrode of the light-emitting device.

At least one embodiment of the present disclosure provides a display device, the display device comprises the display substrate provided by the embodiments of the present disclosure.

BRIEF DESCRIPTION OF DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

Figure 1:
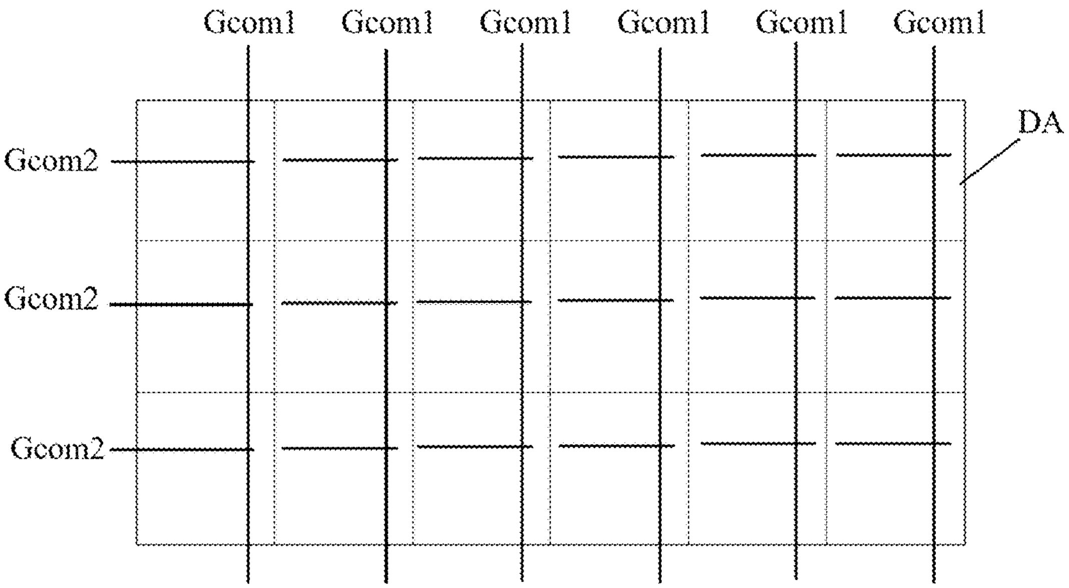
FIG. 1 is a simplified schematic diagram of common scanning signal lines of a display substrate provided by at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

Due to the limitation of large load, medium-sized and large-sized display products cannot well realize the product function of high refresh frequency. For this problem, at least one embodiment of the present disclosure provides a display substrate and a display device. The display substrate includes a plurality of display partitions arranged in a plurality of rows and columns, and at least one of the plurality of display partitions includes a plurality of sub-pixels; the display substrate includes a base substrate and common scanning signal lines, the common scanning signal lines are provided on the base substrate, and include a plurality of first common scanning signal lines extending along a first direction and a plurality of second common scanning signal lines extending along a second direction, and the first direction is different from the second direction; and each of the plurality of second common scanning signal lines is electrically connected to one first common scanning signal line of the plurality of first common scanning signal lines, and is configured to provide a common scanning signal to one display partition of the plurality of display partitions.

The above-mentioned display substrate provided by the embodiments of the present disclosure can utilize the common scanning signal lines to achieve regional control of the display substrate, thereby enabling each display partition to be individually refreshed during a frame of time without affecting the other partitions, and therefore the refresh frequency of the display substrate can be improved as a whole to achieve a high-resolution (PPI) display.

In the following, the display substrate and the display device provided by the embodiments of the present disclosure will be described in detail through several specific embodiments.

Figure 2:
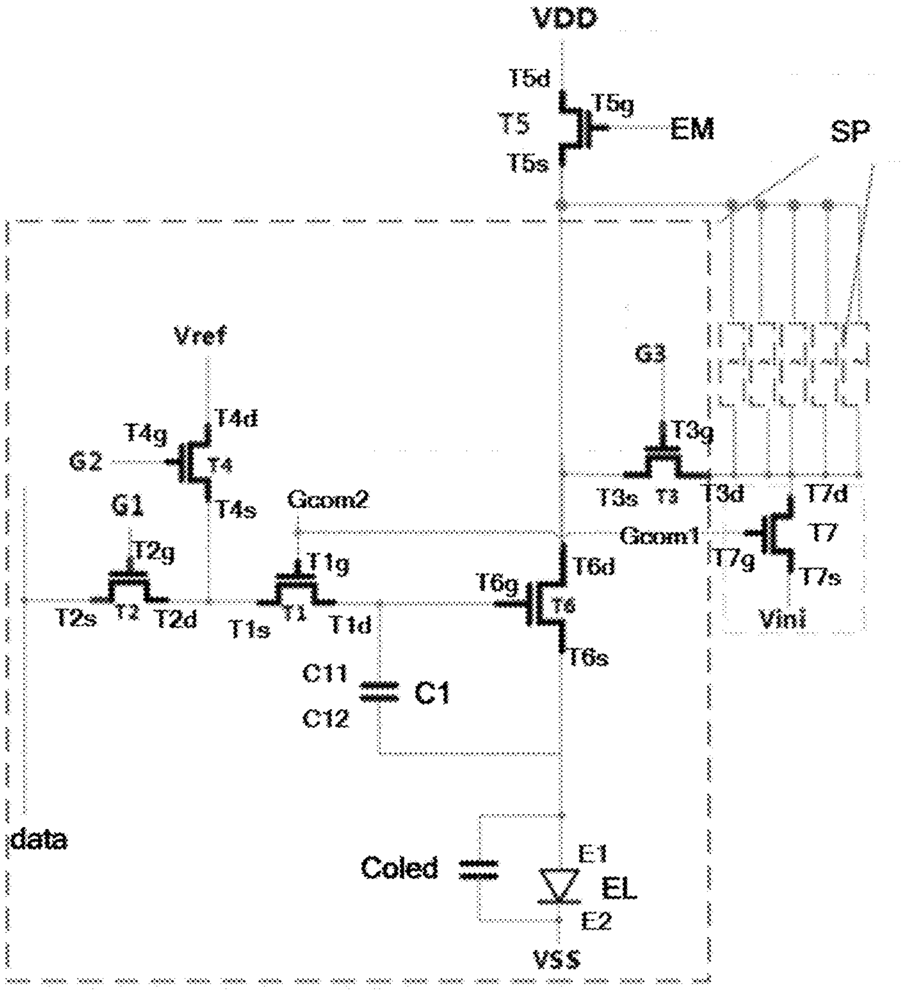
FIG. 2 is a pixel driving circuit diagram of a sub-pixel of a display substrate provided by at least one embodiment of the present disclosure.
Figure 3:
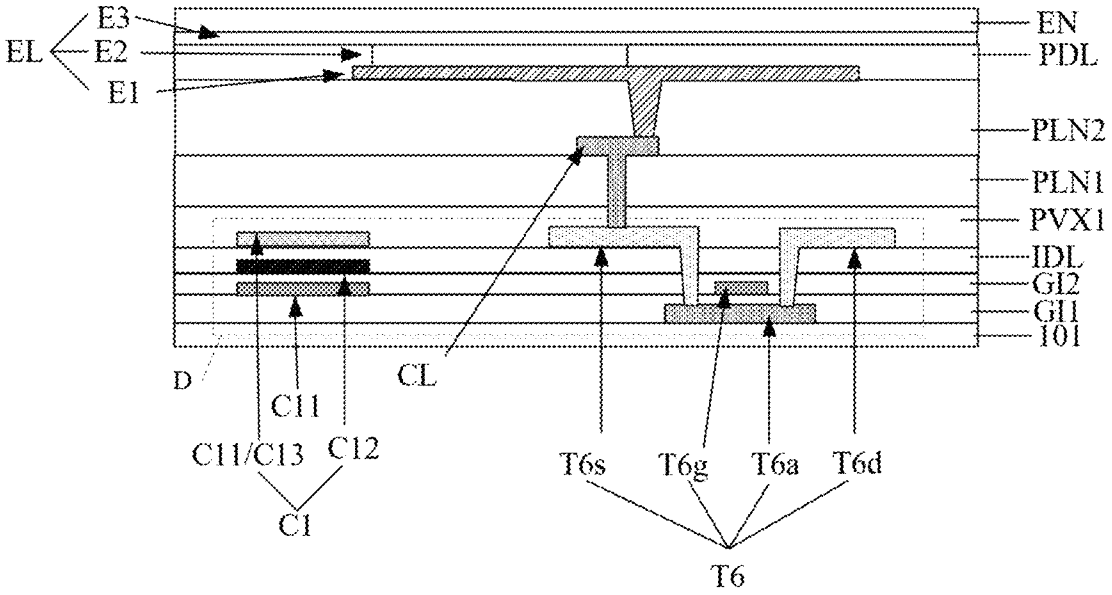
FIG. 3 is a schematic partial cross-sectional view of a sub-pixel of a display substrate provided by at least one embodiment of the present disclosure.

At least one embodiment of the present disclosure provides a display substrate, FIG. 1 is a simplified schematic diagram of common scanning signal lines of the display substrate, FIG. 2 is a pixel driving circuit diagram of a sub-pixel of the display substrate, and FIG. 3 is a schematic partial cross-sectional view of a sub-pixel of the display substrate.

As illustrated in FIG. 1-FIG. 3, the display substrate has a plurality of display partitions DA arranged in a plurality of rows and columns, and at least one (for example, each) of the plurality of display partitions DA includes a plurality of sub-pixels.

The display substrate includes a base substrate 101 and common scanning signal lines, and the common scanning signal lines are provided on the base substrate 101, and include a plurality of first common scanning signal lines Gcom1 extending along a first direction (a vertical direction in the figure) and a plurality of second common scanning signal lines Gcom2 extending along a second direction (a horizontal direction in the figure). The above-mentioned first direction is different from the second direction, for example, the first direction is perpendicular to the second direction. For example, in the example of FIG. 1, the first direction is the column direction of the plurality of display partitions DA, and the second direction is the row direction of the plurality of display partitions DA; and in other examples, the first direction may be the row direction of the plurality of display partitions DA, and the second direction is the column direction of the plurality of display partitions DA.

For example, each second common scanning signal line Gcom2 is electrically connected to one first common scanning signal line Gcom1 of the plurality of first common scanning signal lines Gcom1, and is configured to provide a common scanning signal to one display partition DA of the plurality of display partitions DA.

For example, in some embodiments, as illustrated in FIG. 1, the plurality of first common scanning signal lines Gcom1 are respectively configured to provide common scanning signals to a plurality of columns of display partitions DA, that is, each first common scanning signal line Gcom1 is configured to provide a common scanning signal to the display partitions DA in the same column. For example, in some embodiments, each display partition DA is provided with at least one second common scanning signal line Gcom2, such as a plurality of second common scanning signal lines Gcom2, and each second common scanning signal line Gcom2 is configured to provide a common scanning signal to sub-pixels in the same row in the display partition DA.

For example, in some embodiments, the plurality of first common scanning signal lines Gcom1 and the plurality of second common scanning signal lines Gcom2 are provided in different layers, that is, are not provided in the same layer in the hierarchical structure of the display substrate, and the plurality of first common scanning signal lines Gcom1 and the plurality of second common scanning signal lines Gcom2 have a first overlapping portion OV1 (refer to the following FIG. 8B) in the direction (that is, in the vertical direction in FIG. 3) perpendicular to the base substrate. For example, the display substrate further includes an auxiliary electrode A1 (refer to the following FIG. 11A) provided on a side of the common scanning signal lines away from the base substrate 101, and in the direction perpendicular to the base substrate 101, the auxiliary electrode A1 overlaps with the overlapping portion OV1.

For example, the auxiliary electrode A1 may be electrically connected to a second electrode E1 of a light-emitting device EM through a via, and may be electrically connected to a first power supply line (described in detail later) through a via, thereby connecting the first power supply line to the second electrode E1 in parallel. Because the square resistance of the second electrode E1 is generally large in a large-sized display substrate, this results in different voltages at different locations of the display substrate, for example, undesirable phenomena such as localized potential elevation are generated, thereby affecting the display. The design of connecting the second electrode E1 to the first power supply line through the auxiliary electrode A1 can provide most of the current of the second electrode E1 through the first power supply line to which the auxiliary electrode A1 is electrically connected, which can greatly reduce the effect of the large square resistance of the second electrode E1, so that the second electrodes E1 of the light-emitting devices of the plurality of sub-pixels on the display substrate can obtain substantially the same power supply signal.

For example, in some embodiments, as illustrated in FIG. 3, each sub-pixel includes a pixel driving circuit D and a light-emitting device EL electrically connected to the pixel driving circuit D, and the light-emitting device EL includes a first electrode E1 electrically connected to the pixel driving circuit D, a light-emitting material layer E2 provided on a side of the first electrode E1 away from the base substrate 101, and a second electrode E3 provided on a side of the light-emitting material layer E2 away from the base substrate 101, for example, the auxiliary electrode A1 and the first electrode E1 are provided in the same layer.

For example, in some embodiments, as illustrated in FIG. 2, the pixel driving circuit includes a first transistor T1, and the first transistor T1 includes a first gate electrode T1*g*, a first source electrode T1*s*, and a first drain electrode Tld. For example, the plurality of first common scanning signal lines Gcom1 are provided in the same layer as the first gate electrode Tlg, and the plurality of second common scanning signal lines Gcom2 are provided in the same layer as the first drain electrode Tld.

It should be noted that, in the embodiments of the present disclosure, "provided in the same layer" means that two (or more) functional layers or structural layers are formed in the same layer and with the same material in the hierarchical structure of the display substrate, that is, in the manufacturing process, the two (or more) functional layers or structural layers can be formed from the same material layer, and the required patterns and structures can be formed through the same patterning process.

For example, as illustrated in FIG. 2, the first gate electrode Tlg of the first transistor T1 is electrically connected to one second common scanning signal line Gcom2 to receive a common scanning signal from the second common scanning signal line Gcom2.

For example, the first transistor T1 can be served as a partition control circuit, which is configured to apply at least one of a data voltage provided by a data line data and a reference voltage provided by a reference voltage line Vref to a sixth gate electrode T6*g* of a sixth transistor T6 in response to a common scanning signal provided by the second common scanning signal line Gcom2.

For example, as illustrated in FIG. 2, the pixel driving circuit further includes a second transistor T2, and the second transistor T2 includes a second gate electrode T2*g*, and a second source electrode T2*s* and a drain electrode T2*d* that are provided on a side of the second gate electrode T2*g* away from the base substrate 101. The display substrate further includes a plurality of first scanning signal lines G1, the second gate electrode T2*g* is electrically connected to one of the plurality of first scanning signal lines G1, the second source electrode T2*s* is electrically connected to one of a plurality of data lines data, and the second drain electrode T2*d* is electrically connected to the first source electrode T1*s* of the first transistor T1.

For example, the second transistor T2 can be served as a data writing circuit, which is configured to apply the data voltage provided by the data line data to the sixth gate electrode T6*g* of the sixth transistor T6 in response to a first control signal provided by the first scanning signal line G1.

For example, as illustrated in FIG. 2, the pixel driving circuit further includes a first capacitor C1, the first capacitor C1 includes a first capacitor electrode C11 and a second capacitor electrode C12, the first capacitor electrode C11 is electrically connected to the first drain electrode T1*d* of the first transistor T1, and the second capacitor electrode C12 is electrically connected to the first electrode E1 of the light-emitting device EL. For example, the first capacitor C1 can be served as a storage capacitor.

For example, during a data writing phase, the second transistor T2 is turned on in response to the first scanning signal, so that the data signal is written in, the first transistor T1 is turned on in response to the common scanning signal, the data signal is written into the sixth transistor T6 through the first transistor T1 that is turned on, and the data signal is stored in the first capacitor C1, so that a driving current for driving the light-emitting device EL to emit light can be generated according to the data signal during, for example, a light-emitting phase.

For example, as illustrated in FIG. 2, the pixel driving circuit further includes a third transistor T3, a fourth transistor T4, a fifth transistor T5, a sixth transistor T6, and a first shared transistor T7, and the first shared transistor T7 is shared by at least two adjacent sub-pixels SP, that is, shared by at least two adjacent sub-pixels SP in the same display partition DA.

For example, the fourth transistor T4 includes a fourth gate electrode T4*g*, and a fourth source electrode T4*s* and a fourth drain electrode T4*d* that are provided on a side of the fourth gate electrode T4*g* away from the base substrate, the display substrate further includes a plurality of second scanning signal lines G2 and a plurality of reference voltage lines Vref, the fourth gate electrode T4*g* is electrically connected to one of the plurality of second scanning signal lines G2, the fourth source electrode T4*s* is electrically connected to the first source electrode T1*s* of the first transistor T1 and the second drain electrode T2*d* of the second transistor T2, and the fourth drain electrode T4*d* is electrically connected to one of the plurality of reference voltage lines Vref.

For example, the fourth transistor T4 can be served as a reset circuit, which is configured to apply a reference voltage signal provided by the reference voltage line Vref in response to the second scanning signal provided by the second scanning signal line G2 to implement a voltage reset function.

For example, the third transistor T3 includes a third gate electrode T3*g*, and a third source electrode T3*s* and a third drain electrode T3*d* that are provided on a side of the third gate electrode T3*g* away from the base substrate 101, the display substrate further includes a plurality of third scanning signals line G3, the third gate electrode T3*g* is electrically connected to one of the plurality of third scanning signal lines G3, the third source electrode T3*s* is electrically connected to a sixth drain electrode Tod of the sixth transistor T6 (described later), and the third drain electrode T3*d* is electrically connected to a first shared drain electrode T7*d* (described later) of the first shared transistor T7.

For example, the fifth transistor T5 includes a fifth gate electrode T5*g*, and a fifth source electrode T5*s* and a fifth drain electrode T5*d* that are provided on a side of the fifth gate electrode T5*g* away from the base substrate 101, the fifth gate electrode T5*g* is electrically connected to a light-emitting control signal line EM, the fifth source electrode T5*s* is electrically connected to the sixth drain electrode T6*d* of the sixth transistor T6, and the fifth drain electrode T5*d* is electrically connected to a second power supply line VDD.

For example, the fifth transistor T5 can be served as a light-emitting control circuit, which is configured to apply a second power supply voltage provided by the second power supply line VDD to the sixth transistor T6 in response to a light-emitting control signal provided by the light-emitting control line EM. For example, during a light-emitting phase, the fifth transistor T5 is turned on in response to the light-emitting control signal, so that the second power supply voltage is applied to the sixth transistor T6, and when the sixth transistor is turned on, the second power supply voltage is applied to the light-emitting device EL through the sixth transistor to provide a driving voltage, thereby driving the light-emitting device EL to emit light.

For example, in some embodiments, the fifth transistor T5 may also be shared by at least two adjacent sub-pixels, for example, may be shared by at least two adjacent repeating units in some embodiments.

For example, the sixth transistor T6 includes a sixth gate electrode T6*g*, and a sixth source electrode T6*s* and a sixth drain electrode T6*d* that are provided on a side of the sixth gate electrode T6*g* away from the base substrate 101, the sixth gate electrode T6*g* is electrically connected to the first drain electrode Tld of the first transistor T1 and the first capacitor electrode C11 of the first capacitor C1, the sixth source electrode T6*s* is electrically connected to the first electrode E1 of the light-emitting device EL and the second capacitor electrode C12 of the first capacitor C1, and the sixth drain electrode T6*d* is electrically connected to the fifth source electrode T5*s* of the fifth transistor T5 and the third source electrode T3*s* of the third transistor T3.

For example, the sixth transistor T6 can be served as a driving circuit of the light-emitting device EL, and during the light-emitting phase, the sixth transistor T6 can provide the driving current to the light-emitting device EL to drive the light-emitting device EL to emit light, and the light-emitting device EL can emit light according to the required "gray scale".

For example, the first shared transistor T7 includes a first shared gate electrode T7*g*, and a first shared source electrode T7*s* and a first shared drain electrode T7*d* that provided on a side of the first shared gate electrode T7*g* away from the base substrate 101, and the first shared gate electrode T7*g* is electrically connected to one of the plurality of first common scanning signal lines Gcom1; and the display substrate further includes a plurality of reset voltage lines Vini, the first shared source electrode T7*s* is electrically connected to one of the plurality of reset voltage lines Vini, and the first shared drain electrode T7*d* is electrically connected to third drain electrodes T3*d* of third transistors T3 in pixel driving circuits of the plurality of sub-pixels SP.

For example, the third transistor T3 and the first shared transistor T7 can be served as another reset circuit. When the first shared transistor T7 is turned on in response to the common scanning signal, and the third transistor T3 is turned on in response to the third scan signal, a reset signal can be written into one terminal of the sixth transistor T6 to reset it.

For example, an intrinsic capacitance Coled may be formed between the first electrode E1 and the second electrode E2 of the light-emitting device EL.

For example, in the embodiments of the present disclosure, the source electrode and drain electrode of each transistor are symmetrical in structure, and the functions and connection modes of the source electrode and drain electrode can be interchanged.

For example, in the above-mentioned pixel driving circuit, the first transistor T1 can be served as a partition control circuit of the display partition DA, which is configured to apply at least one of the data voltage provided by the data line data and the reference voltage provided by the reference voltage line Vref to the sixth gate electrode Tog of the sixth transistor T6 in response to the common scanning signal provided by the second common scanning signal line Gcom2; the sixth transistor T6 can be served as the driving circuit of the light-emitting device EL, and the first shared transistor T7 is configured to apply a reset voltage provided by the reset voltage line Vini to the sixth transistor T6 in response to the common scanning signal provided by the first common scanning signal line Gcom1 and the third scanning signal provided by the third scanning signal line G3 to enable the pixel driving circuit to achieve the partitioned display.

In the above-mentioned pixel driving circuit provided by the embodiments of the present disclosure, the first transistor T1 (partition control circuit) and the first shared transistor T7 (reset circuit) are both turned on in response to the common scanning signal to realize resetting of the sixth gate electrode, the sixth source electrode and the sixth drain electrode of the sixth transistor T6 (driving circuit), and to realize writing of the data signal into the driving circuit, and therefore the pixel driving circuit can achieve the partitioned display; for example, a display image of a certain display partition is updated individually while the display images of other display partitions are not updated, which is beneficial to achieve the ultra-high refresh frequency of the display partitions and reduce the overall power consumption of the display substrate.

For example, as illustrated in FIG. 3, in the hierarchical structure of the display substrate, active layers of respective transistors (FIG. 3 illustrates a sixth active layer T6*a* of the sixth transistor T6 connected to the light-emitting device EL) are provided in the same layer on the base substrate 101, this functional layer may also be referred to as a semiconductor layer of the display substrate, and a first gate insulation layer GI1 is provided on the semiconductor layer.

For example, in some embodiments, as illustrated in FIG. 3, the first capacitor electrode C11 of the first capacitor C1 includes two portions respectively overlapping with the second capacitor electrode C12, and gate electrodes (the sixth gate electrode Tog of the sixth transistor T6 is illustrated in the figure) of respective transistors and a first portion of the first capacitor electrode C11 of the first capacitor C1 are provided on the first gate insulation layer GI1 and in the same layer, this functional layer may also be referred to as a first gate metal layer of the display substrate, and a second gate insulation layer GI2 is provided on the first gate metal layer. For example, the second capacitor electrode C12 is provided on the first gate insulation layer GI1, this functional layer may also be referred to as a second gate metal layer of the display substrate, and an interlayer insulation layer IDL is provided on the second gate metal layer.

For example, as illustrated in FIG. 3, the source electrodes and drain electrodes of respective transistors (the sixth source electrode T6*s* and the sixth drain electrode T6*d* of the sixth transistor T6 are illustrated in the figure) and another portion C13 (that is, a second portion) of the first capacitor electrode C11 are provided on the interlayer insulation layer IDL and in the same layer, this functional layer may also be referred to as a first source-drain metal layer of the display substrate, and a first passivation layer PVX1 and a first planarization layer PLN1 are provided on the first source-drain metal layer.

For example, as illustrated in FIG. 3, the display substrate further includes a connection electrode CL provided on the first planarization layer PLN1, the connection electrode CL is configured to electrically connect the first electrode E1 of the light-emitting device EL to the pixel driving circuit D, and the functional layer where the connection electrode CL is located may also be referred to as a second source-drain metal layer. A second planarization layer PLN2 is provided on the second source-drain metal layer, and the first electrode E1 of the light-emitting device EL is provided on the second planarization layer PLN2.

For example, as illustrated in FIG. 3, the display substrate further includes a pixel definition layer PDL provided on the first electrode E1 of the light-emitting device EL. The pixel definition layer PDL includes a plurality of sub-pixel openings for defining light-emitting regions of a plurality of sub-pixels, and the light-emitting material layer E2 is at least provided in the sub-pixel openings. For example, the second electrodes E3 of the plurality of light-emitting devices EL are formed to be an integrated electrode provided continuously, and an encapsulation layer EN is provided above the second electrodes E3 to achieve the encapsulation of the display substrate. For example, the encapsulation layer EN may be a composite encapsulation layer including a plurality of inorganic encapsulation layers and organic encapsulation layer(s) to improve the encapsulation effect on the display substrate.

For example, FIG. 4-FIG. 11B illustrate schematic plan views of respective functional layers of the display substrate provided by at least one embodiment of the present disclosure, and schematic plan views of respective functional layers stacked in sequence.

Figure 4:
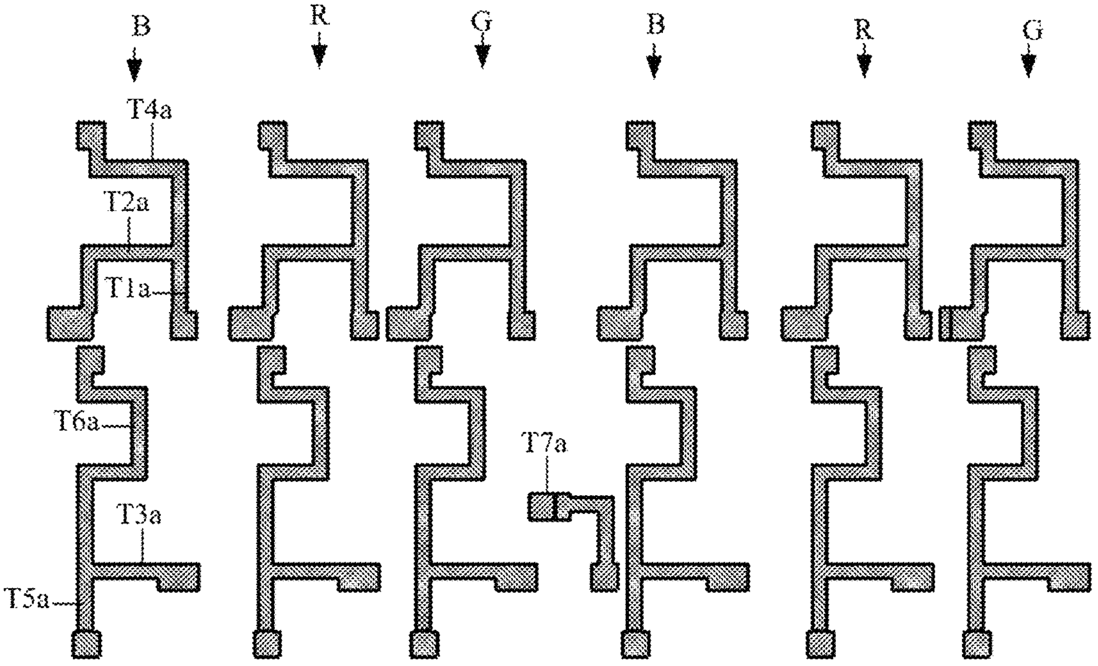
FIG. 4-FIG. 11B are schematic plan views of respective functional layers of the display substrate provided by at least one embodiment of the present disclosure, and schematic plan views of respective functional layers stacked in sequence.

For example, FIG. 4 illustrates a schematic plan view of the semiconductor layer of the display substrate. As illustrated in FIG. 4, the semiconductor layer includes active layers T1*a*-T7*a* of respective transistors.

For example, a first active layer T1*a* of the first transistor T1, a second active layer T2*a* of the second transistor T2, and a fourth active layer T4*a* of the fourth transistor T4 are connected as a whole, a third active layer T3*a* of the third transistor T3, a fifth active layer T5*a* of the fifth transistor T5, and a sixth active layer T6*a* of the sixth transistor T6 are connected as a whole, and a first shared active layer T7*a* of the first shared transistor T7 is provided separately, and because the first shared transistor T7 is shared by at least two sub-pixels, the arrangement density of the first shared active layer T7*a* is smaller than the arrangement density of the above-mentioned active layers T1*a*-T6*a*.

For example, in some embodiments, the plurality of sub-pixels included in the display substrate include a red sub-pixel R, a green sub-pixel G, and a blue sub-pixel B, and the orthographic projection of the first shared active layer T7*a* on the base substrate 101 is between the orthographic projections of the pixel driving circuits of the adjacent green sub-pixel G and blue sub-pixel B on the base substrate 101. For example, in FIG. 4, the orthographic projection of the first shared active layer T7*a* on the base substrate 101 is between the orthographic projections of the active layers T1*a*-T6*a* of the respective transistors of the adjacent green sub-pixel G and blue sub-pixel B on the base substrate 101.

For example, in some embodiments, the plurality of sub-pixels include a plurality of repeating units arranged in an array, and each repeating unit includes a plurality of sub-pixels emitting light of different colors, such as a red sub-pixel R, a green sub-pixel G, and a blue sub-pixel B, the orthographic projection of the first shared active layer T7*a* on the base substrate 101 is between the orthographic projections of the pixel driving circuits of two adjacent repeating units on the base substrate 101, and the first shared transistor T7 is shared by at least two adjacent repeating units, that is, shared by six sub-pixels. For example, in other embodiments, the first shared transistor T7 may also be configured to be shared by three or more repeating units.

For example, as illustrated in FIG. 4, in some embodiments, the planar shape of the first shared active layer T7*a* may be a bent shape with a right-angle turn.

Figure 5A:
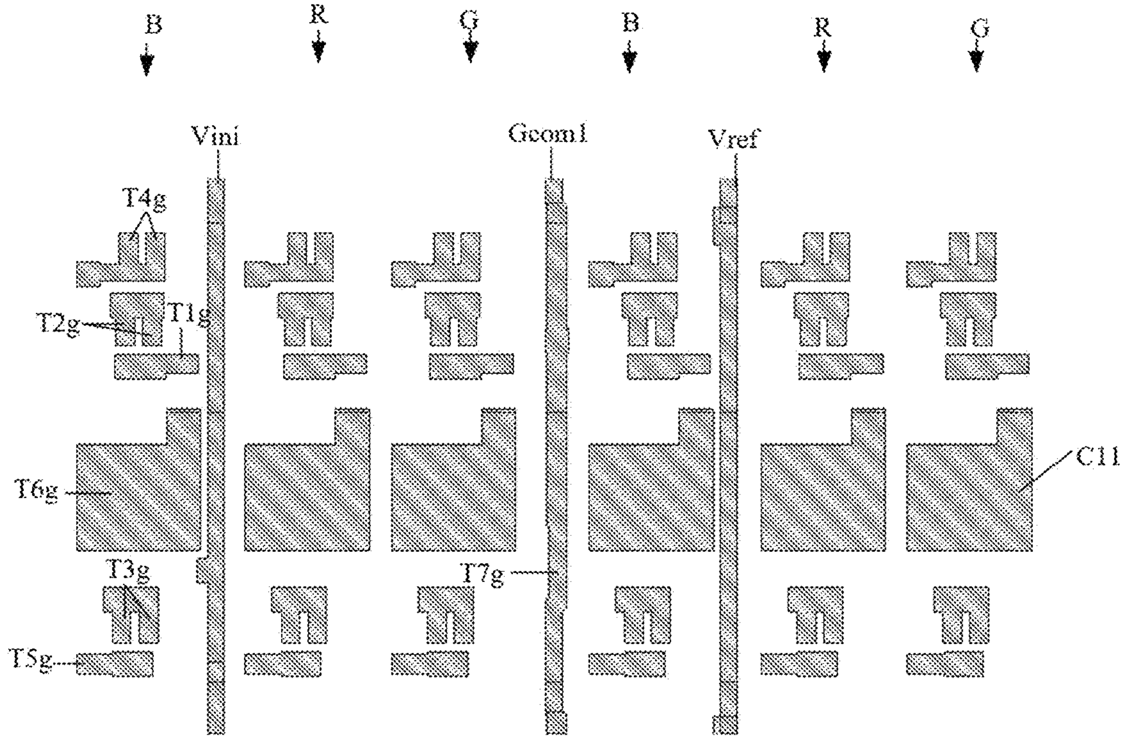
Figure 5B:
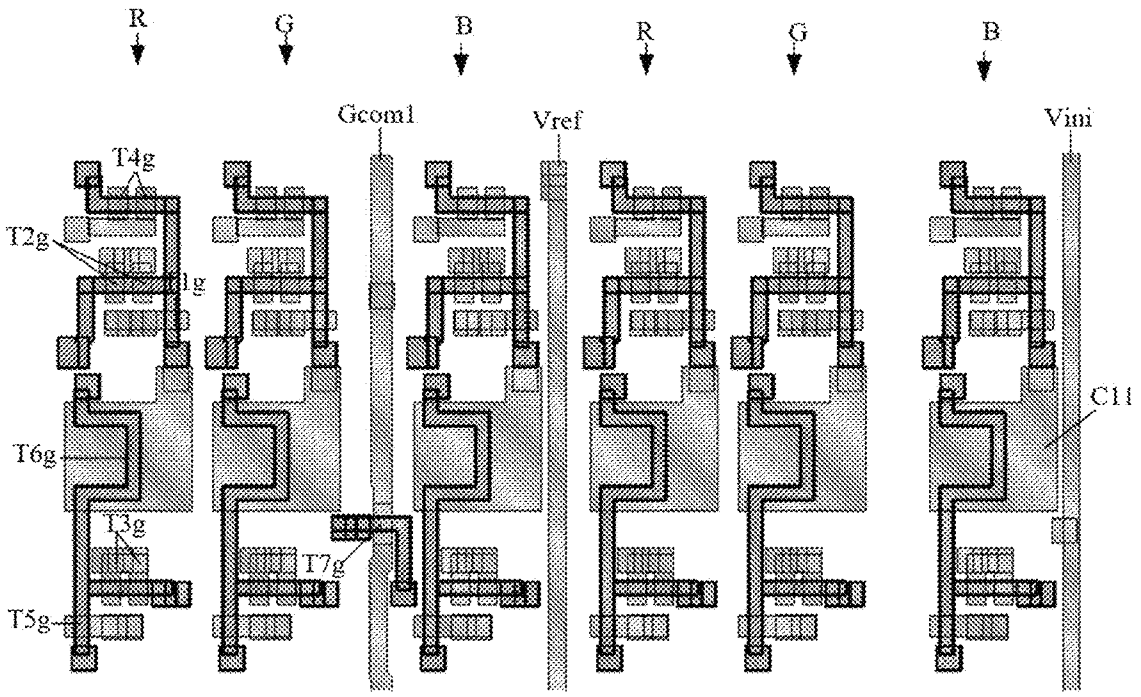

For example, FIG. 5A illustrates a schematic plan view of the first gate metal layer of the display substrate, and FIG. 5B illustrates a schematic plan view of the first gate metal layer of the display substrate stacked with the semiconductor layer.

For example, as illustrated in FIG. 5A, the first gate metal layer includes gate electrodes T1*g*-T7*g* of respective transistors, a portion of the first capacitor electrode C11, the reset voltage line Vini, the first common scanning signal line Gcom1, and the reference voltage line Vref. For example, the reset voltage line Vini, the first common scanning signal line Gcom1 and the reference voltage line Vref all extend along the first direction (i.e., the vertical direction in the figure).

For example, the orthographic projection of at least part of at least one of the plurality of first common scanning signal lines Gcom1 on the base substrate 101 is between the orthographic projections of the pixel driving circuits of adjacent repeating units on the base substrate 101.

For example, in some embodiments, each display partition DA is correspondingly provided with at least one reset voltage line Vini, one first common scanning signal line Gcom1 and one reference voltage line Vref. For example, the reset voltage line Vini, the first common scanning signal line Gcom1 and the reference voltage line Vref are respectively between different sub-pixels.

For example, in the present embodiment, the reset voltage line Vini extends between the pixel driving circuits of the adjacent blue sub-pixel B and red sub-pixel R, that is, the orthographic projection of the reset voltage line Vini on the base substrate is between the orthographic projections of the pixel driving circuits of the adjacent blue sub-pixel B and red sub-pixel R on the base substrate; the first common scanning signal line Gcom1 extends between the pixel driving circuits of the adjacent blue sub-pixel B and green sub-pixel G, that is, the orthographic projection of the first common scanning signal line Gcom1 on the base substrate is between the orthographic projections of the pixel driving circuits of the adjacent blue sub-pixel B and green sub-pixel G on the base substrate; and the reference voltage line Vref extends between the pixel driving circuits of the adjacent blue sub-pixel B and red sub-pixel R, that is, the orthographic projection of the reference voltage line Vref on the base substrate is between the orthographic projections of the pixel driving circuits of the adjacent blue sub-pixel B and red sub-pixel R on the base substrate.

For example, in the direction perpendicular to the base substrate 101, the first common scanning signal line Gcom1 has a second overlapping portion (that is, the portion indicated by the symbol T7*g* in FIG. 5B) overlapping with the first shared active layer T7*a*, and the second overlapping portion is served as the first shared gate electrode T7*g*, so that the first shared gate electrode T7*g* is also between the pixel driving circuits of the adjacent blue sub-pixel B and green sub-pixel G.

For example, in the first gate metal layer, the first capacitor electrode C11 and the sixth gate electrode T6*g* of the sixth transistor are connected as a whole.

Figure 6A:
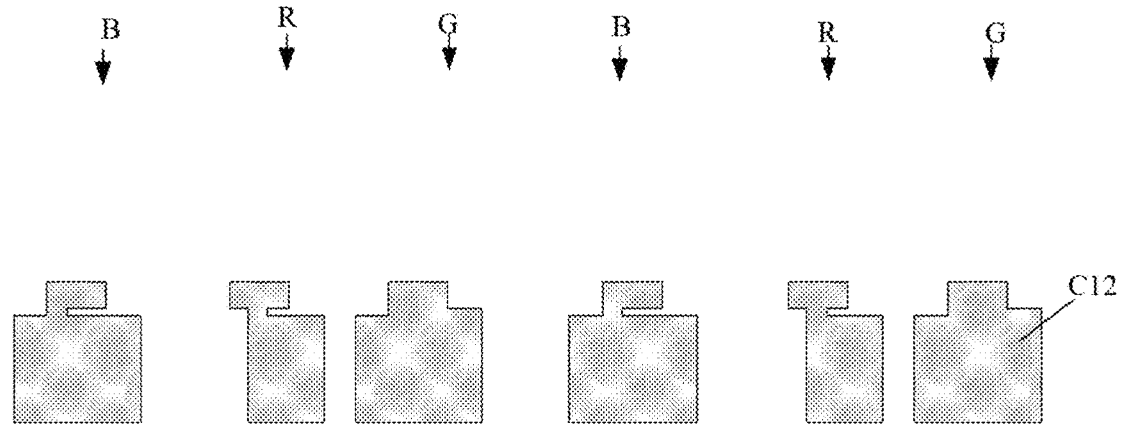
Figure 6B:
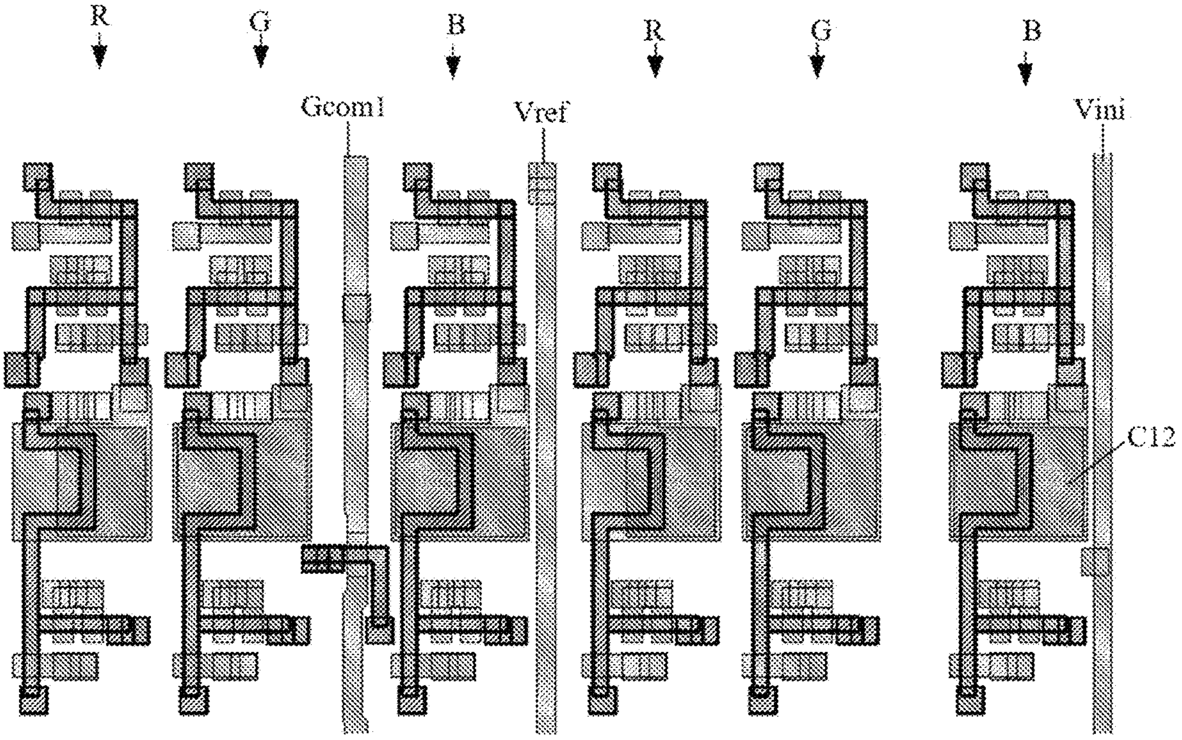

For example, FIG. 6A illustrates a schematic plan view of the second gate metal layer of the display substrate, and FIG. 6B illustrates a schematic plan view of the second gate metal layer of the display substrate stacked with the first gate metal layer and the semiconductor layer.

For example, as illustrated in FIG. 6A, the second gate metal layer includes the second capacitor electrode C12. As illustrated in FIG. 6B, in the direction perpendicular to the base substrate 101, the second capacitor electrode C12 overlaps with the first capacitor electrode C11, thus forming the first capacitor C1.

Figure 7A:
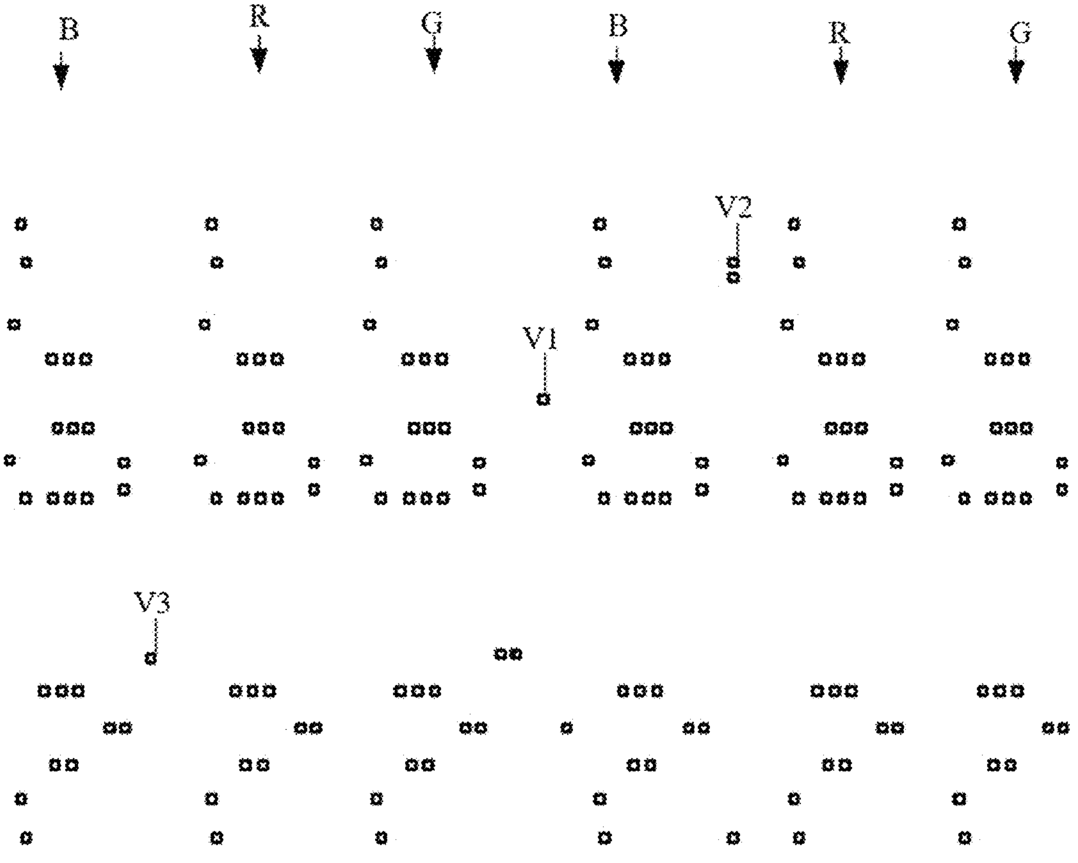
Figure 7B:
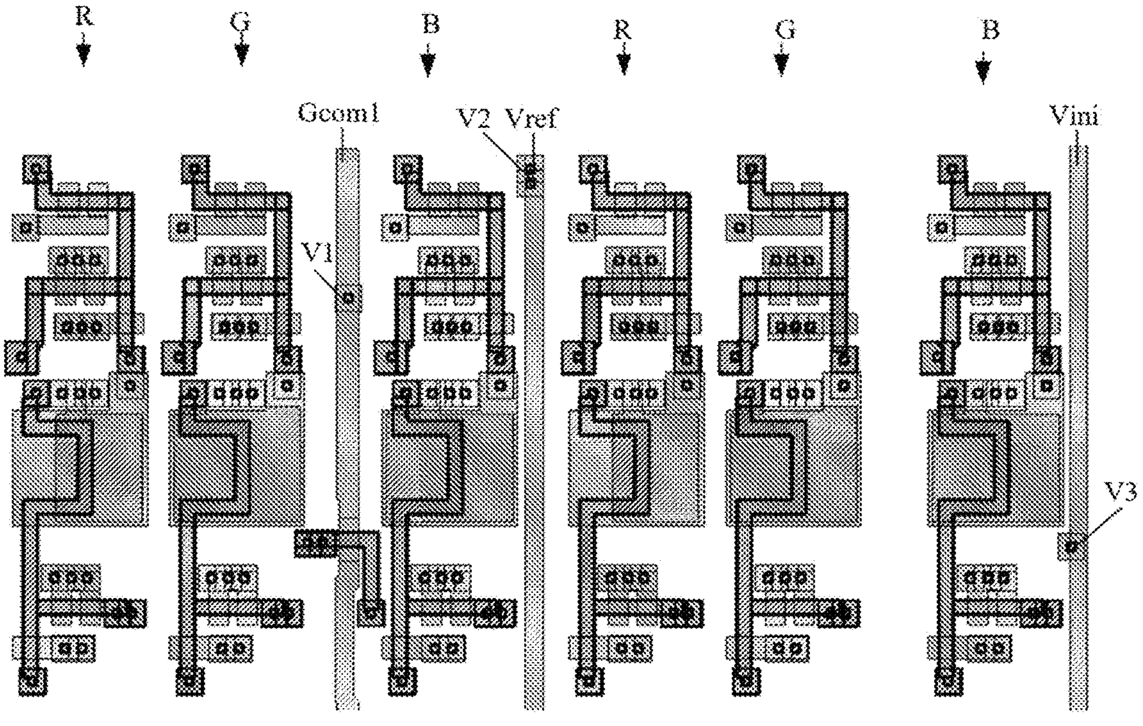

For example, FIG. 7A illustrates a schematic plan view of the interlayer insulation layer of the display substrate, and FIG. 7B illustrates a schematic plan view of the interlayer insulation layer of the display substrate stacked with the second gate metal layer, the first gate metal layer, and the semiconductor layer.

For example, as illustrated in FIG. 7A and FIG. 7B, the interlayer insulation layer includes a plurality of vias, such as a first via V1 for electrically connecting the first common scanning signal line Gcom1 to the second common scanning signal line Gcom2, a second via V2 for electrically connecting the reference voltage line Vref extending along the first direction to the reference voltage line Vref1 extending along the second direction, a third via V3 for electrically connecting the reset voltage line Vini extending along the first direction to the reset voltage line Vini1 extending along the second direction, and other vias for circuit connection of respective transistors, which will not be repeated here.

Figure 8A:
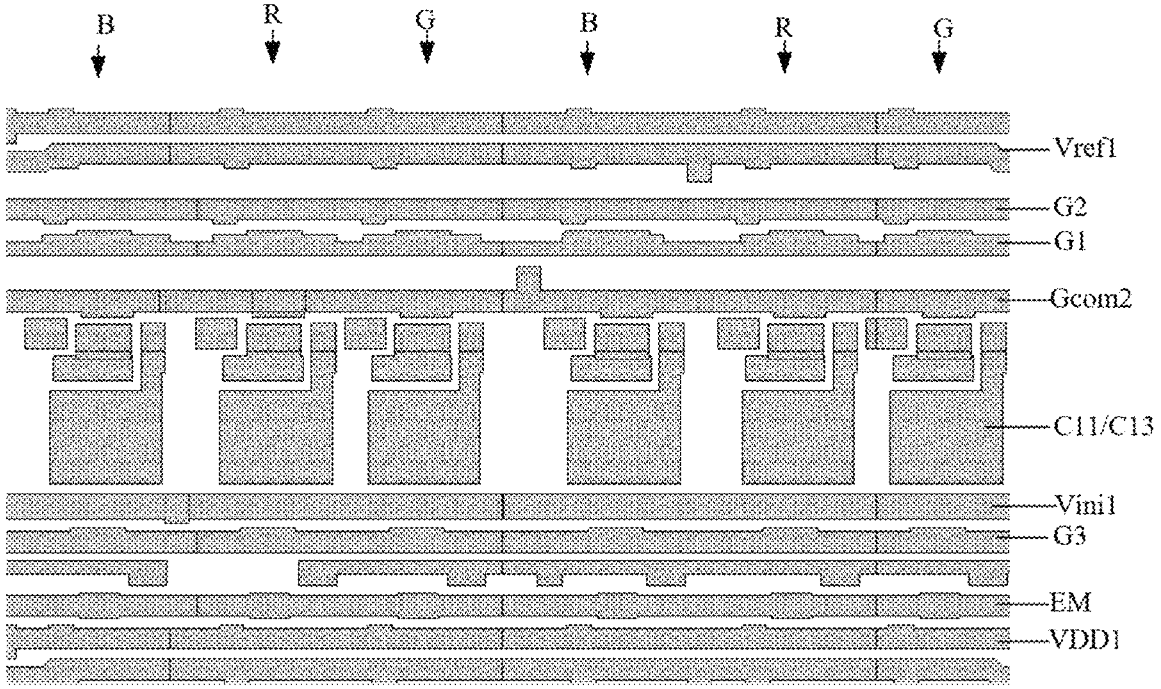
Figure 8B:
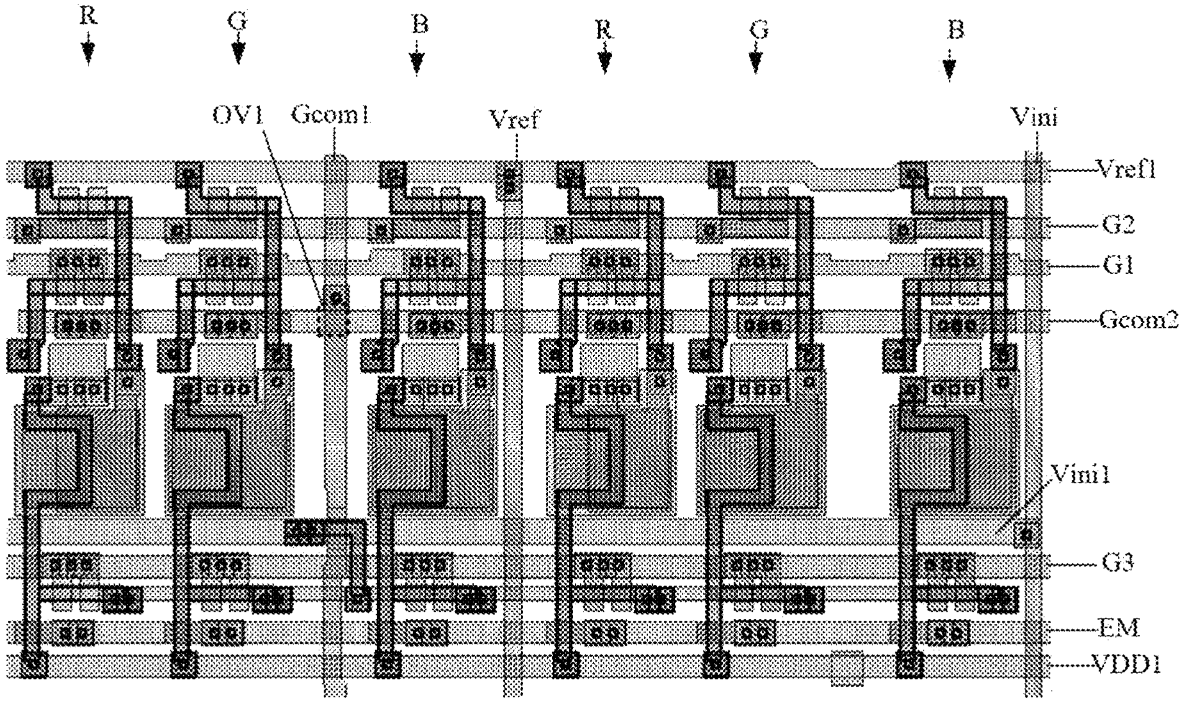

For example, FIG. 8A illustrates a schematic plan view of the first source-drain metal layer of the display substrate, and FIG. 8B illustrates a schematic plan view of the first source-drain metal layer of the display substrate stacked with the interlayer insulation layer, the second gate metal layer, the first gate metal layer, and the semiconductor layer.

For example, as illustrated in FIG. 8A, the first source-drain metal layer includes the reference voltage line Vref1, the first scanning signal line G1, the second scanning signal line G2, the third scanning signal line G3, the reset voltage line Vini1, the second common scanning signal line Gcom2, the light-emitting control signal line EM, and the second power supply voltage line VDD1 extending along the second direction and the another portion C13 of the first capacitor electrode C11.

For example, as illustrated in FIG. 8A and FIG. 8B, the orthographic projection of at least one of the plurality of second common scanning signal lines Gcom2 on the base substrate 101 is between the orthographic projection of one first scanning signal line G1 on the base substrate 101 and the orthographic projection of the first capacitor electrode C11, which is adjacent to the one first scanning signal line G1, on the base substrate 101.

For example, in the pixel driving circuit of the same sub-pixel, the reference voltage line Vref1, the second scanning signal line G2, the first scanning signal line G1, the second common scanning signal line Gcom2, the first capacitor electrode C11, the reset voltage line Vini1, the third scanning signal line G3, the light-emitting control signal line EM and the second power supply voltage line VDD1 are sequentially arranged along the first direction.

For example, as illustrated in FIG. 8B, the plurality of first common scanning signal lines Gcom1 and the plurality of second common scanning signal lines Gcom2 have the first overlapping portion OV1 in the direction perpendicular to the base substrate 101.

Figure 9A:
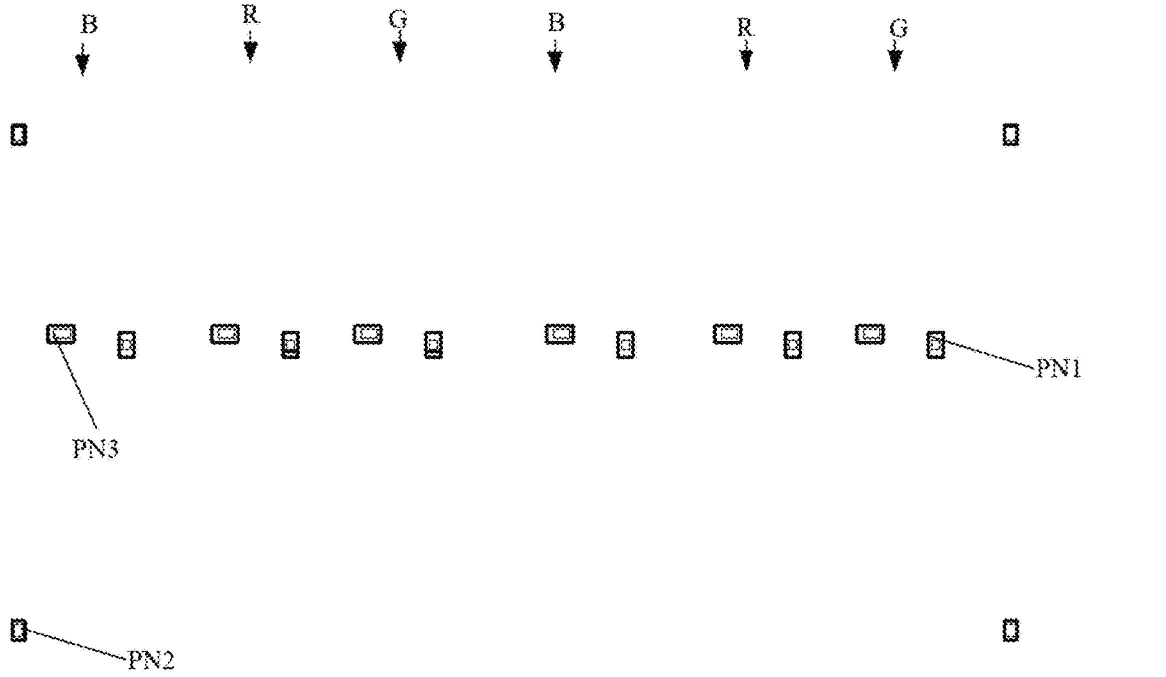
Figure 9B:
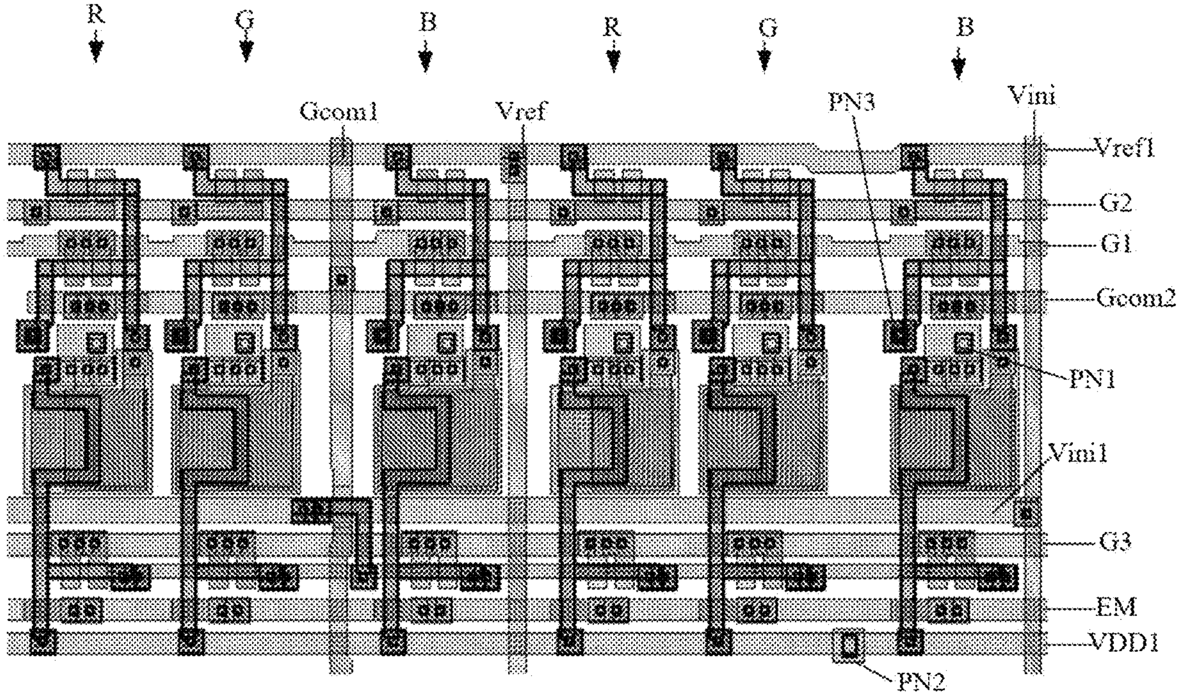

For example, FIG. 9A illustrates a schematic plan view of the first passivation layer and the first planarization layer of the display substrate, and FIG. 9B illustrates the first passivation layer and the first planarization layer of the display substrate stacked with the first source-drain metal layer, the interlayer insulation layer, the second gate metal layer, the first gate metal layer, and the semiconductor layer.

For example, as illustrated in FIG. 9A, the first passivation layer PVX1 and the first planarization layer PLN1 include a plurality of vias, such as a via PN1 for electrically connecting the pixel driving circuit to the connection electrode CL, a via PN2 for electrically connecting the second power supply line VDD1 extending along the second direction to the second power supply line VDD extending along the first direction, and a via PN3 for electrically connecting the data line data to the pixel driving circuit.

Figure 10A:
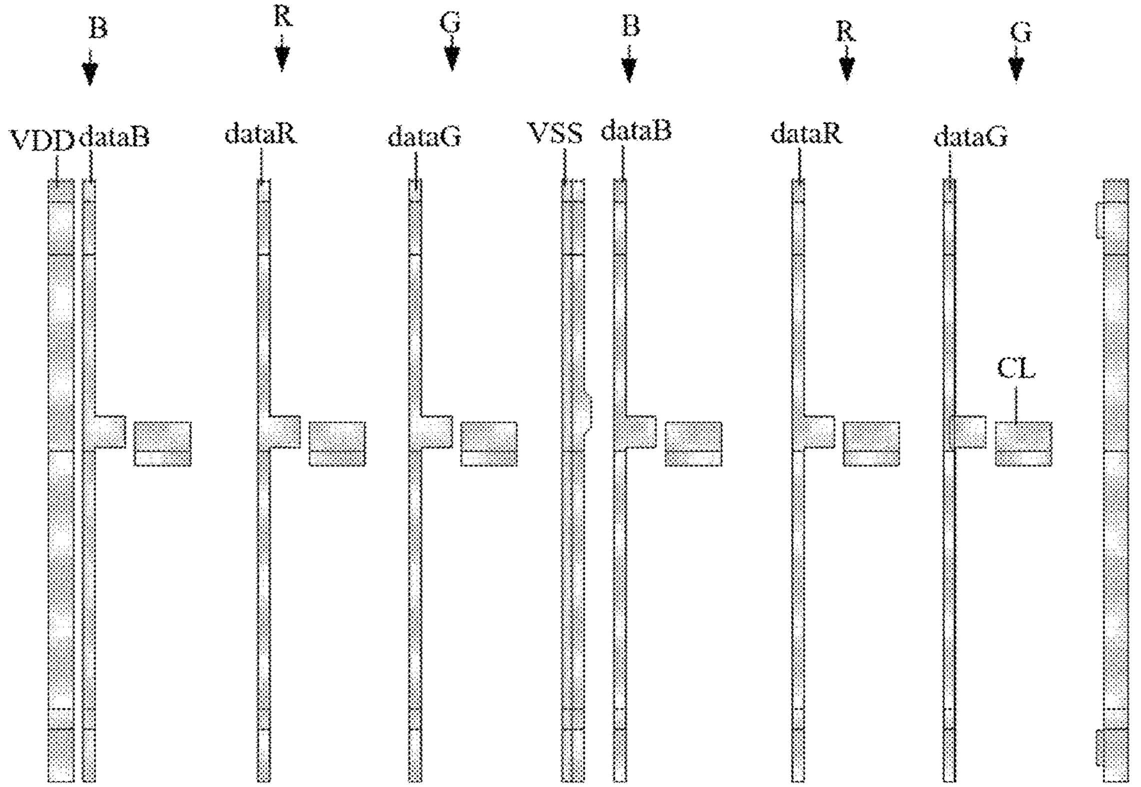
Figure 10B:
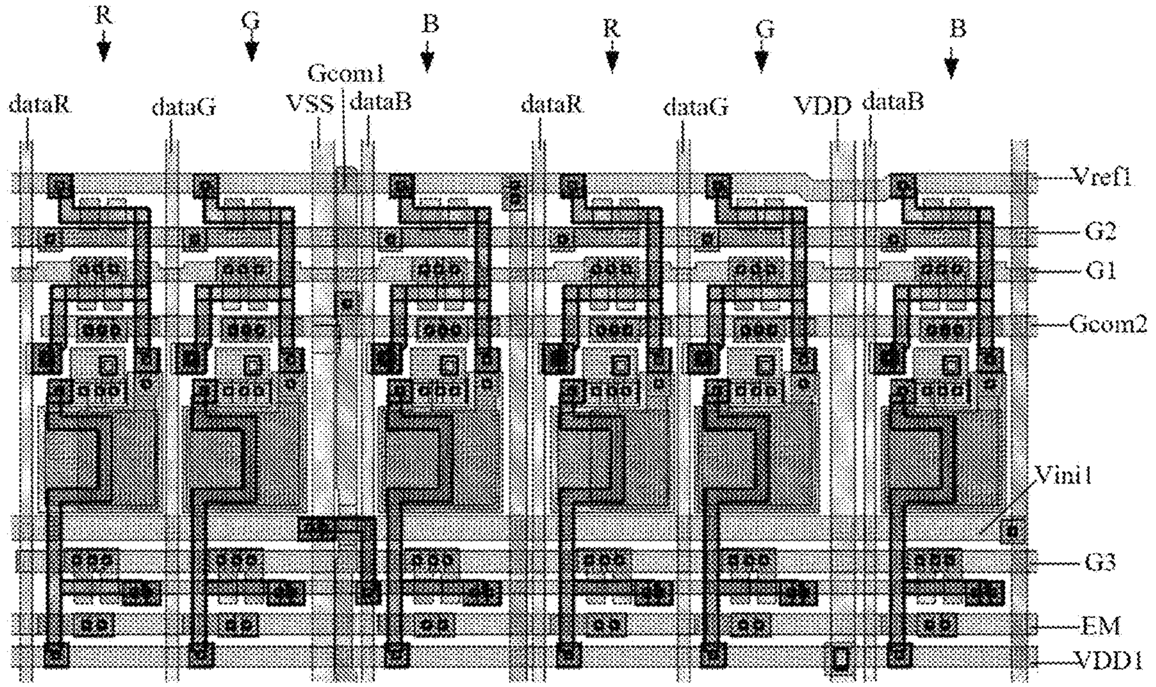

For example, FIG. 10A illustrates a schematic plan view of the second source-drain metal layer of the display substrate, and FIG. 10B illustrates the second source-drain metal layer of the display substrate stacked with the first passivation layer, the first planarization layer, the first source-drain metal layer, the interlayer insulation layer, the second gate metal layer, the first gate metal layer, and the semiconductor layer.

For example, as illustrated in FIG. 10A, the second source-drain metal layer includes the first power supply line VSS, the second power supply line VDD, the data line data, and the connection electrode CL.

For example, the plurality of data lines data are configured to provide data signals to a plurality of sub-pixels, for example, including data lines dataR providing data signals for red sub-pixels, data lines dataB providing data signals for blue sub-pixels, and data lines dataG providing data signals for green sub-pixels.

For example, the plurality of first power supply lines VSS and the plurality of data lines data respectively extend along the first direction, and the plurality of first power supply lines VSS are configured to provide a first power supply signal to the plurality of sub-pixels, such as a low-level power supply signal, such as a ground signal. For example, the plurality of first power supply lines VSS are electrically connected to the second electrodes E3 of the light-emitting devices EL of the sub-pixels, respectively.

For example, as illustrated in FIG. 10B, the orthographic projection of at least part of at least one of the plurality of first common scanning signal lines Gcom1 on the base substrate 101 is between the orthographic projections of one data line data and one first power supply line VSS, which are adjacent to each other, on the base substrate 101.

For example, in the embodiment of FIG. 10B, the orthographic projection of at least part of at least one of the plurality of first common scanning signal lines Gcom1 on the base substrate 101 is between the orthographic projection of one data line data, which provides a data signal to the blue sub-pixel, on the base substrate 101 and the orthographic projection of one first power supply line VSS, which is adjacent to the one data line data providing the data signal to the blue sub-pixel, on the base substrate 101.

For example, the plurality of second power supply lines VDD extend along the first direction and are configured to provide a second power supply signal, such as a high-level power supply signal, to a plurality of sub-pixels, and the potential of the second power supply signal is higher than the potential of the first power supply signal. For example, the plurality of second power supply lines VDD are electrically connected to the first electrodes E1 of the light-emitting devices EL of the sub-pixels, respectively.

For example, the plurality of first power supply lines VSS and the plurality of second power supply lines VDD are provided in the same layer, that is, provided in the second source-drain metal layer, and provided alternately along the second direction (the horizontal direction in the figure), that is, one second power supply line VDD is provided between two adjacent first power supply lines VSS, and one first power supply line VSS is provided between two adjacent second power supply lines VDD.

For example, the plurality of data lines data and the plurality of first power supply lines VSS are provided in the same layer, and provided on a side of the first source electrode T1*s* and the first drain electrode Tld away from the base substrate 101.

Figure 11A:
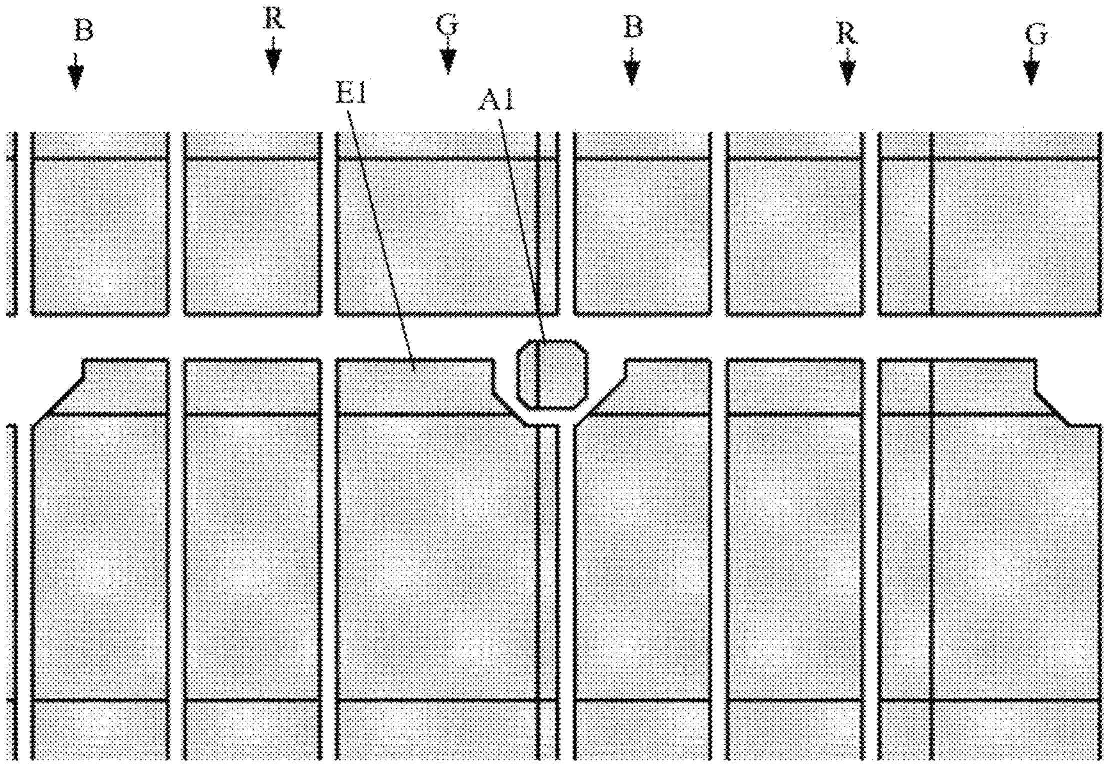
Figure 11B:
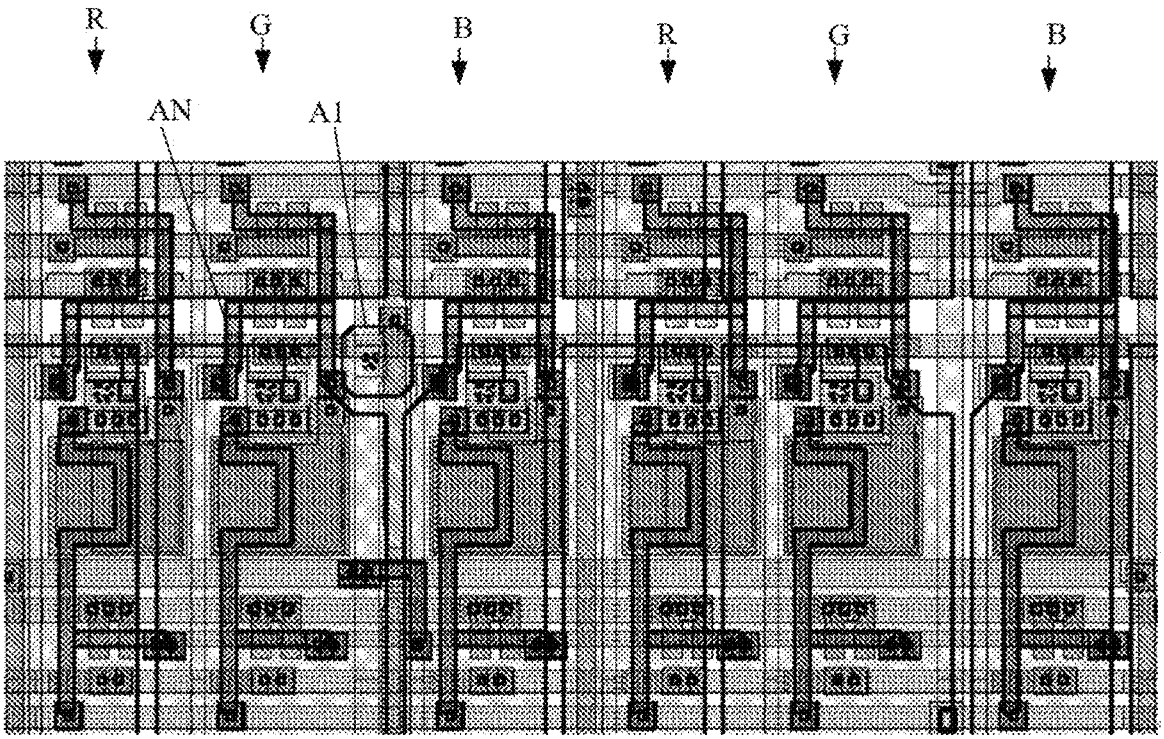

For example, FIG. 11A illustrates a schematic plan view of a first electrode layer of the display substrate, and FIG. 11B illustrates the first electrode layer of the display substrate stacked with the second source-drain metal layer, the first passivation layer, the first planarization layer, the first source-drain metal layer, the interlayer insulation layer, the second gate metal layer, the first gate metal layer, and the semiconductor layer.

For example, as illustrated in FIG. 11A and FIG. 11B, the first electrode layer includes the first electrode E1 of the light-emitting device EL and the auxiliary electrode A1, and in the direction perpendicular to the base substrate 101, the auxiliary electrode A1 at least partially overlaps with the first overlapping portion OV1. For example, the auxiliary electrode A1 as a whole is in the shape of a polygon with chamfered or rounded corners.

For example, the orthographic projection of the auxiliary electrode A1 on the base substrate 101 is between the orthographic projections of the first electrodes E1 of the light-emitting devices EL of the adjacent blue sub-pixel and green sub-pixel on the base substrate 101.

For example, the orthographic projection of the first electrode E1 of the light-emitting device of the red sub-pixel R on the base substrate 101 at least partially overlaps with the orthographic projections of one data line data and one reference voltage line Vref on the base substrate 101; the orthographic projection of the first electrode E1 of the light-emitting device of the sub-pixel B on the base substrate 101 at least partially overlaps with the orthographic projection of one data line data on the base substrate 101; and the orthographic projection of the first electrode E1 of the light-emitting device of the green sub-pixel G on the base substrate 101 at least partially overlaps with the orthographic projections of one data line data and one first power supply line VSS on the base substrate 101.

For example, functional layers such as a light-emitting material layer, a second electrode layer, and an encapsulation layer are further provided on the first electrode layer, which will not be repeated here.

Figure 12:
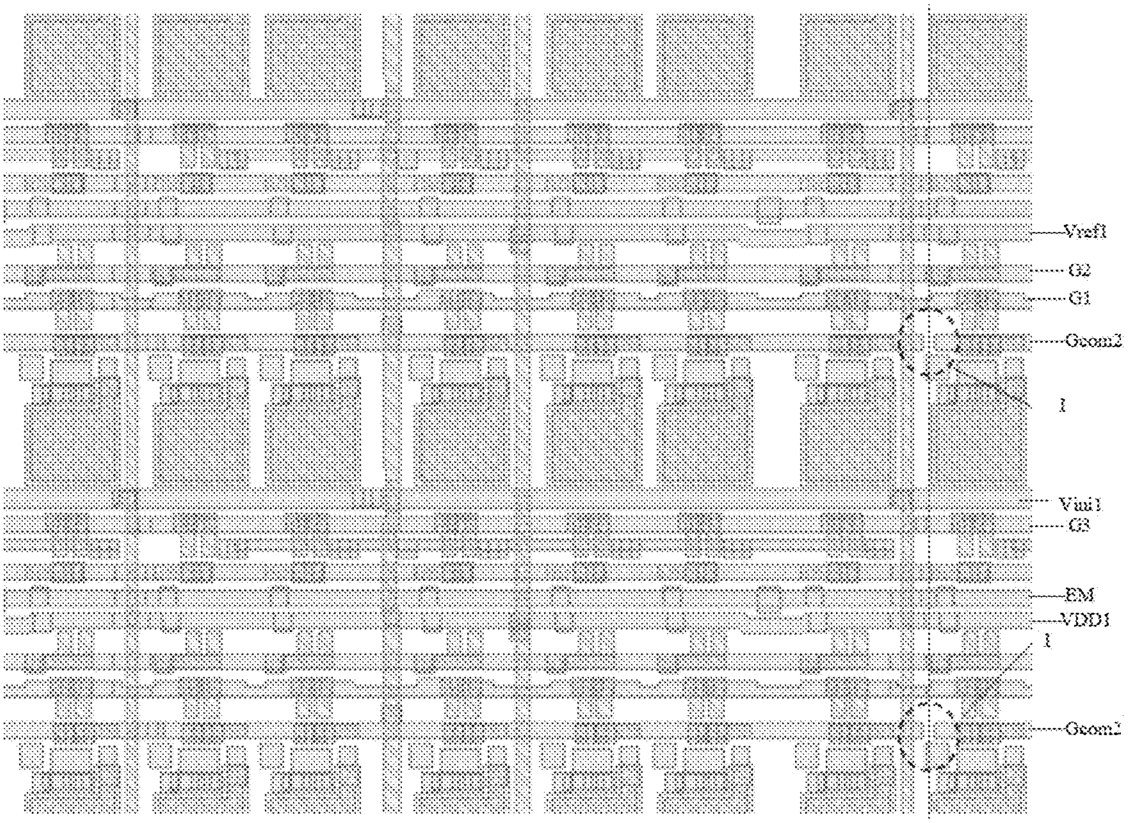
FIG. 12 is another schematic plan view of a display substrate provided by at least one embodiment of the present disclosure.

For example, in some embodiments, as illustrated in FIG. 12, intervals I are provided between the plurality of second common scanning signal lines Gcom2 in the same row, that is, the intervals I are provided between the plurality of second common scanning signal lines Gcom2 in the same row and in different display partitions, so as to provide common scanning signals for different display partitions.

Figure 13:
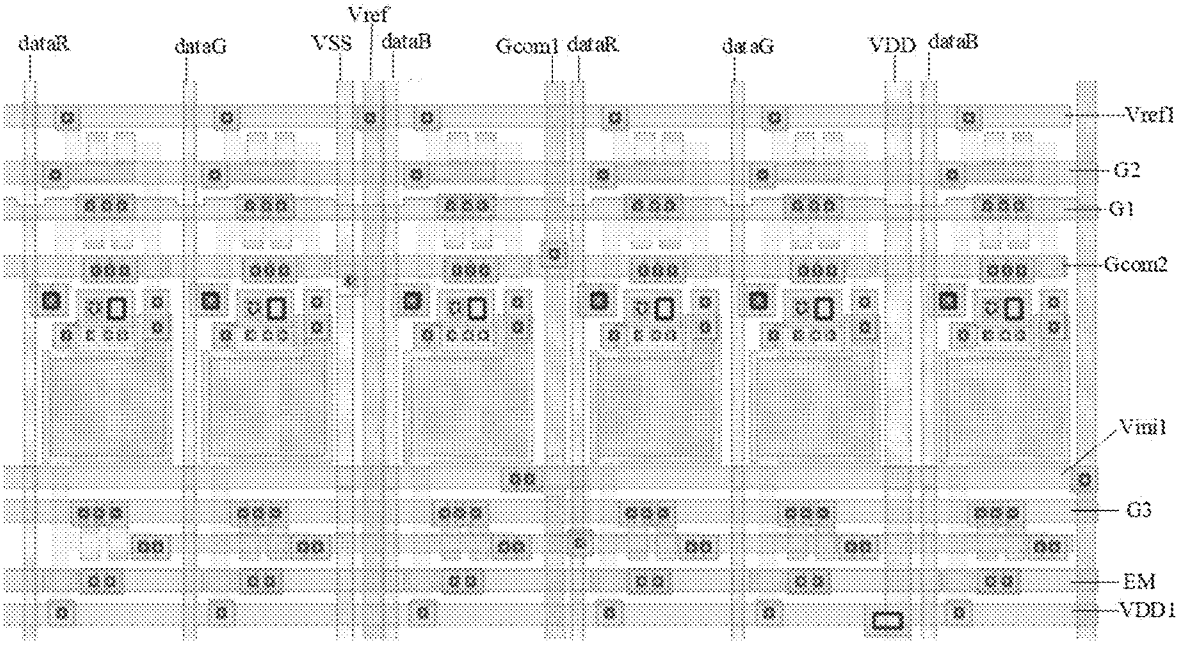
FIG. 13 is a schematic plan view of another display substrate provided by at least one embodiment of the present disclosure.

For example, in other embodiments, the plurality of first common scanning signal lines Gcom1 may also be provided at other positions. For example, in some other embodiments, as illustrated in FIG. 13, the orthographic projection of at least one of the plurality of first common scanning signal lines Gcom1 on the base substrate 101 is between the orthographic projection of one data line dataB for providing a data signal to the blue sub-pixel B on the base substrate 101 and the orthographic projection of one data line dataR, which is adjacent to the data line dataB, for providing a data signal to the red sub-pixel R on the base substrate 101. For example, in this case, the orthographic projection of the reference voltage line Vref on the base substrate 101 is between the orthographic projection of one first power supply line VSS on the base substrate 101 and the orthographic projection of one data line dataB, which is adjacent to the one first power supply line VSS, for providing a data signal to the blue sub-pixel B on the base substrate 101.

Figure 14:
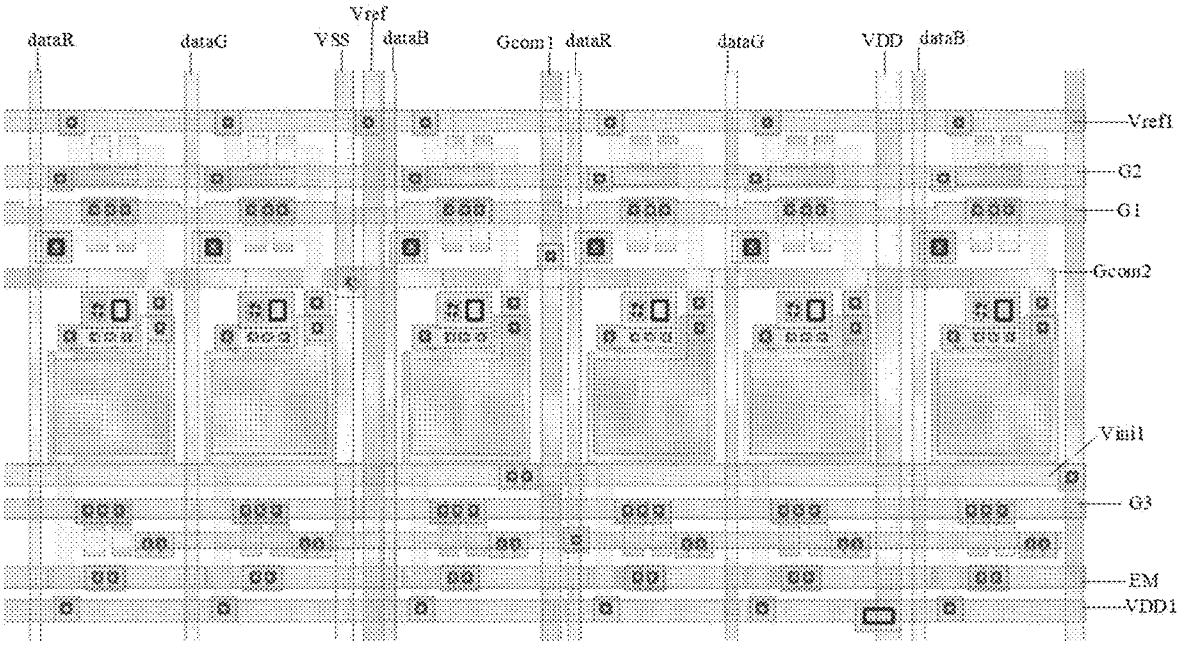
FIG. 14 is a schematic plan view of further another display substrate provided by at least one embodiment of the present disclosure.

For example, the above-mentioned embodiments are introduced by taking the case where the plurality of first common scanning signal lines Gcom and the plurality of second common scanning signal lines Gcom2 are provided in different layers as an example. For example, in some other embodiments, as illustrated in FIG. 14, the plurality of first common scanning signal lines Gcom1 and the plurality of second common scanning signal lines Gcom2 may also be provided in the same layer, for example, provided in the same layer as the first gate electrode Tlg, that is, provided in the first gate metal layer. Therefore, the first common scanning signal line Gcom1 and the second common scanning signal line Gcom2 do not need to be electrically connected through a via.

For example, in the embodiments of the present disclosure, the base substrate 101 may be a flexible substrate, or may be a rigid substrate. The rigid substrate may include, but are not limited to, one or more of glass and quartz, and the flexible substrate may include, but are not limited to, one or more of polyethylene terephthalate, polyethylene terephthalate, polyether ether ketone, polystyrene, polycarbonate, polyaryl ester, polyarylate, polyimide, polyvinyl chloride, polyethylene, and textile fiber. For example, in some examples, the flexible substrate may include a first flexible material layer, a first inorganic material layer, a semiconductor layer, a second flexible material layer and a second inorganic material layer that are stacked with each other, in which the materials of the first flexible material layer and the second flexible material layer may be materials such as polyimide (PI), polyethylene terephthalate (PET), or surface-treated polymer flexible film, and the materials of the first inorganic material layer and the second inorganic material layer may be materials such as silicon nitride (SiNx) or silicon oxide (SiOx), etc., for improving the water and oxygen resistance of the substrate.

For example, the material of the semiconductor layer may be a semiconductor material such as a metal oxide, for example, an amorphous indium gallium zinc oxide material (a-IGZO), zinc oxynitride (ZnON), indium zinc tin oxide (IZTO), or amorphous silicon (a-Si), polycrystalline silicon (p-Si), sexithiophene or polythiophene, etc.

For example, the first gate metal layer, the second gate metal layer, the first source-drain metal layer, and the second source-drain metal layer may be made of a metal material, such as any one or more of titanium (Ti), copper (Cu), aluminum (Al), and molybdenum (Mo), or an alloy of the above metals, such as an aluminum-neodymium alloy (AlNd) or a molybdenum-niobium alloy (MoNb), and may have a single-layer structure, or a multilayer composite structure, such as a Mo/Cu/Mo multilayer structure, etc. The materials of the first gate metal layer, the second gate metal layer, the first source-drain metal layer and the second source-drain metal layer may be the same or different.

For example, the first gate insulation layer GI1, the second gate insulation layer GI2, the interlayer insulation layer IDL and the first passivation layer PVX1 may be made of any one or more of silicon oxide (SiOx), silicon nitride (SiNx) and silicon oxynitride (SiON), and may be a single-layer structure or a multilayer structure. The materials of the first gate insulation layer GI1, the second gate insulation layer GI2 and the interlayer insulation layer IDL may be the same or different.

For example, the first planarization layer PLN1 and the second planarization layer PLN2 may be made of organic materials, such as polyimide, resin, etc. The materials of the first planarization layer PLN1 and the second planarization layer PLN2 may be the same or different.

For example, the first electrode E1 of the light-emitting device EL may be made of transparent metal oxides such as indium tin oxide (ITO), indium zinc oxide (IZO), gallium zinc oxide (GZO), or stacked layers including a transparent metal oxide and a metal (such as silver). The material of the second electrode E3 may be a metal material such as lithium (Li), aluminum (Al), magnesium (Mg), silver (Ag), etc. The light-emitting material layer E2 may be made of organic light-emitting materials or quantum dot light-emitting materials capable of emitting red, green or blue light.

For example, the encapsulation layer EN may be stacked layers including an organic encapsulation material and an inorganic encapsulation material, and the organic encapsulation material may be polyimide, resin, etc., and the inorganic encapsulation material may be silicon oxide (SiOx), silicon nitride (SiNx), or silicon oxynitride (SiON), etc. The embodiments of the present disclosure do not limit the specific material of each of the above-mentioned functional layers.

At least one embodiment of the present disclosure further provides a display device, and the display device includes the display substrate provided by the embodiments of the present disclosure. For example, the display device may be any product or component with a display function, such as a mobile phone, a tablet computer, a television, a monitor, a notebook computer, a digital photo frame, a navigator, and the like.

The following statements should be noted:

(1) The drawings involve only the structure(s) in connection with the embodiment(s) of the present disclosure, and other structure(s) can be referred to common design(s).

(2) For clarity, in the drawings used to describe the embodiments of the present disclosure, the thicknesses of layers or regions are enlarged or reduced, that is, the drawings are not drawn to actual scale. It can be understood that when a component such as a layer, film, region or substrate is referred to as being "on" or "under" another component, the component may be "directly" "on" or "under" another component, or one or more intermediate components may be interposed therebetween.

(3) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. A display substrate, comprising a plurality of display partitions arranged in a plurality of rows and columns, wherein at least one of the plurality of display partitions comprises a plurality of sub-pixels, and the display substrate comprises:

a base substrate; and common scanning signal lines, on the base substrate and comprising a plurality of first common scanning signal lines extending along a first direction and a plurality of second common scanning signal lines extending along a second direction, wherein the first direction is different from the second direction, and each of the plurality of second common scanning signal lines is electrically connected to one first common scanning signal line of the plurality of first common scanning signal lines, and is configured to provide a common scanning signal to one display partition of the plurality of display partitions;

intervals are provided between a plurality of second common scanning signal lines in a same row;

the display substrate further comprises an auxiliary electrode provided on a side of the plurality of first common scanning signal lines and the plurality of second common scanning signal lines away from the base substrate, the sub-pixel comprises a pixel driving circuit and a light-emitting device electrically connected to the pixel driving circuit;

the light-emitting device comprises a first electrode electrically connected to the pixel driving circuit, a light-emitting material layer on a side of the first electrode away from the base substrate, and a second electrode on a side of the light-emitting material layer away from the base substrate; and the auxiliary electrode is provided in a same layer as the first electrode, and is electrically connected to the second electrode.

2. The display substrate according to claim 1, wherein the plurality of first common scanning signal lines and the plurality of second common scanning signal lines are provided in different layers, and have a first overlapping portion in a direction perpendicular to the base substrate;

and in the direction perpendicular to the base substrate, the auxiliary electrode overlaps with the first overlapping portion.

3. The display substrate according to claim 1, wherein the plurality of sub-pixels comprise a plurality of repeating units arranged in an array, and each of the plurality of repeating units comprises a plurality of sub-pixels emitting light of different colors; and an orthographic projection of at least part of at least one of the plurality of first common scanning signal lines on the base substrate is between orthographic projections of pixel driving circuits of adjacent repeating units on the base substrate.

4. The display substrate according to claim 1, wherein the plurality of sub-pixels comprise a plurality of repeating units arranged in an array, and each of the plurality of repeating units comprises a red sub-pixel, a green sub-pixel and a blue sub-pixel pixel; and an orthographic projection of at least one of the plurality of first common scanning signal lines on the base substrate is between an orthographic projection of one data line, which provides a data signal to the blue sub-pixel, on the base substrate and an orthographic projection of one data line, which provides a data signal to the green sub-pixel and is adjacent to the one data line providing the data signal to the blue sub-pixel, on the base substrate.

5. A display device, comprising the display substrate according to claim 1.

6. A display substrate, comprising a plurality of display partitions arranged in a plurality of rows and columns, wherein at least one of the plurality of display partitions comprises a plurality of sub-pixels, and the display substrate comprises:

a base substrate; and common scanning signal lines, on the base substrate and comprising a plurality of first common scanning signal lines extending along a first direction and a plurality of second common scanning signal lines extending along a second direction, wherein the first direction is different from the second direction, and each of the plurality of second common scanning signal lines is electrically connected to one first common scanning signal line of the plurality of first common scanning signal lines, and is configured to provide a common scanning signal to one display partition of the plurality of display partitions;

the plurality of first common scanning signal lines and the plurality of second common scanning signal lines are provided in different layers, and have a first overlapping portion in a direction perpendicular to the base substrate;

the display substrate further comprises an auxiliary electrode provided on a side of the plurality of first common scanning signal lines and the plurality of second common scanning signal lines away from the base substrate; and in the direction perpendicular to the base substrate, the auxiliary electrode overlaps with the first overlapping portion;

wherein the sub-pixel comprises a pixel driving circuit and a light-emitting device electrically connected to the pixel driving circuit;

the light-emitting device comprises a first electrode electrically connected to the pixel driving circuit, a light-emitting material layer on a side of the first electrode away from the base substrate, and a second electrode on a side of the light-emitting material layer away from the base substrate; and the auxiliary electrode is provided in a same layer as the first electrode, and is electrically connected to the second electrode.

7. The display substrate according to claim 6, wherein the pixel driving circuit comprises a first transistor, the first transistor comprises a first gate electrode, a first source electrode and a first drain electrode; and the plurality of first common scanning signal lines and the first gate electrode are provided in a same layer, and the first gate electrode is electrically connected to one of the plurality of second common scanning signal lines.

8. The display substrate according to claim 7, further comprising:

a plurality of data lines, respectively extending along the first direction and configured to provide data signals to the plurality of sub-pixels; and a plurality of first power supply lines, respectively extending along the first direction and configured to provide first power supply signals to the plurality of sub-pixels, wherein an orthographic projection of at least part of at least one of the plurality of first common scanning signal lines on the base substrate is between orthographic projections of one data line and one first power supply line, which are adjacent to each other, on the base substrate; and at least one of the plurality of first power supply lines is electrically connected to the auxiliary electrode.

9. The display substrate according to claim 8, further comprising:

a plurality of second power supply lines, respectively extending along the first direction and configured to provide second power supply signals to the plurality of sub-pixels, wherein a potential of the second power supply signal is higher than a potential of the first power supply signal; and the plurality of first power supply lines and the plurality of second power supply lines are provided in a same layer and provided alternately along the second direction.

10. The display substrate according to claim 8, wherein the plurality of sub-pixels comprise a red sub-pixel, a green sub-pixel and a blue sub-pixel, and an orthographic projection of at least part of at least one of the plurality of first common scanning signal lines on the base substrate is between an orthographic projection of one data line, which provides a data signal to the blue sub-pixel, on the base substrate and an orthographic projection of one first power supply line, which is adjacent to the one data line providing the data signal to the blue sub-pixel, on the base substrate.

11. The display substrate according to claim 8, wherein the pixel driving circuit further comprises a second transistor, and the second transistor comprises a second gate electrode, and a source electrode and a drain electrode that are on a side of the second gate electrode away from the base substrate;

the display substrate further comprises a plurality of first scanning signal lines;

the second gate electrode is electrically connected to one of the plurality of first scanning signal lines;

the second source electrode is electrically connected to one of the plurality of data lines; and the second drain electrode is electrically connected to the first source electrode.

12. The display substrate according to claim 11, wherein the pixel driving circuit further comprises a first capacitor, and the first capacitor comprises a first capacitor electrode and a second capacitor electrode;

the first capacitor electrode is electrically connected to the first drain electrode, and the second capacitor electrode is electrically connected to the first electrode; and the first capacitor electrode comprises a first portion in a same layer as the first gate electrode and a second portion in a same layer as the first drain electrode.

13. The display substrate according to claim 12, wherein an orthographic projection of at least one of the plurality of second common scanning signal lines on the base substrate is between an orthographic projection of one first scanning signal line on the base substrate and an orthographic projection of the first capacitor electrode, which is adjacent to the one first scanning signal line, on the base substrate.

14. The display substrate according to claim 12, wherein the pixel driving circuit further comprises a first shared transistor, and the first shared transistor is shared by at least two adjacent sub-pixels;

the first shared transistor comprises a first shared gate electrode, and a first shared source electrode and a first shared drain electrode that are on a side of the first shared gate electrode away from the base substrate; and the first shared gate electrode is electrically connected to one of the plurality of first common scanning signal lines.

15. The display substrate according to claim 14, wherein the first shared transistor further comprises a first shared active layer, the plurality of sub-pixels comprise a plurality of repeating units arranged in an array, and each of the plurality of repeating units comprises a plurality of sub-pixels emitting light of different colors; and an orthographic projection of the first shared active layer on the base substrate is between orthographic projections of pixel driving circuits of adjacent repeating units on the base substrate;

in a direction perpendicular to the base substrate, one of the plurality of first common scanning signal lines has a second overlapping portion overlapping with the first shared active layer, and the second overlapping portion is served as the first shared gate electrode.

16. The display substrate according to claim 14, wherein the plurality of sub-pixels comprise a red sub-pixel, a green sub-pixel and a blue sub-pixel, and taking one red sub-pixel, one green sub-pixel and one blue sub-pixel as a repeating unit, the first shared transistor is shared by at least two adjacent repeating units.

17. The display substrate according to claim 7, wherein the plurality of first common scanning signal lines and the plurality of second common scanning signal lines are in a same layer, and are in a same layer as the first gate electrode.

18. The display substrate according to claim 7, wherein each display partition is correspondingly provided with at least one reset voltage line, one first common scanning signal line and one reference voltage line, and the at least one reset voltage line, the one first common scanning signal line and the one reference voltage line are respectively between different sub-pixels.

19. The display substrate according to claim 18, wherein the plurality of sub-pixels comprise a plurality of repeating units arranged in an array, at least one of the plurality of repeating units comprises a red sub-pixel, a green sub-pixel and a blue sub-pixel, an orthographic projection of a first electrode of a light-emitting device of the red sub-pixel on the base substrate at least partially overlaps with orthographic projections of one data line and one reference voltage line on the base substrate;

an orthographic projection of a first electrode of a light-emitting device of the blue sub-pixel on the base substrate at least partially overlaps with an orthographic projection of one data line on the base substrate; and an orthographic projection of a first electrode of a light-emitting device of the green sub-pixel on the base substrate at least partially overlaps with orthographic projections of one data line and one first power supply line on the base substrate.

20. A display substrate, comprising a plurality of display partitions arranged in a plurality of rows and columns, wherein at least one of the plurality of display partitions comprises a plurality of sub-pixels, and the display substrate comprises:

a base substrate; and common scanning signal lines, on the base substrate and comprising a plurality of first common scanning signal lines extending along a first direction and a plurality of second common scanning signal lines extending along a second direction, wherein the first direction is different from the second direction, and each of the plurality of second common scanning signal lines is electrically connected to one first common scanning signal line of the plurality of first common scanning signal lines, and is configured to provide a common scanning signal to one display partition of the plurality of display partitions;

the plurality of first common scanning signal lines and the plurality of second common scanning signal lines are provided in different layers, and have a first overlapping portion in a direction perpendicular to the base substrate;

the display substrate further comprises an auxiliary electrode provided on a side of the plurality of first common scanning signal lines and the plurality of second common scanning signal lines away from the base substrate; and in the direction perpendicular to the base substrate, the auxiliary electrode overlaps with the first overlapping portion;

wherein the sub-pixel comprises a pixel driving circuit and a light-emitting device electrically connected to the pixel driving circuit, and the pixel driving circuit comprises a first transistor, a second transistor, a third transistor, a fourth transistor, a fifth transistor, a sixth transistor, a first shared transistor and a first capacitor;

the first transistor comprises a first gate electrode, a first source electrode and a first drain electrode, and the first gate electrode is electrically connected to the second common scanning signal line;

the second transistor comprises a second gate electrode, a second source electrode and a second drain electrode, the second gate electrode is electrically connected to a first scanning signal line, the second source electrode is electrically connected to a data line, and the second drain electrode is electrically connected to the first source electrode;

the third transistor comprises a third gate electrode, a third source electrode and a third drain electrode, and the third gate electrode is electrically connected to a third scanning signal line;

the fourth transistor comprises a fourth gate electrode, a fourth source electrode and a fourth drain electrode, the fourth gate electrode is electrically connected to a second scanning signal line, the fourth source electrode is electrically connected to the first source electrode and the second drain electrode, and the fourth drain electrode is electrically connected to a reference voltage line;

the fifth transistor comprises a fifth gate electrode, a fifth source electrode and a fifth drain electrode, the fifth gate electrode is electrically connected to a light-emitting control signal line, and the fifth drain electrode is electrically connected to a second power supply line;

the first shared transistor comprises a first shared gate electrode, a first shared source electrode and a first shared drain electrode, the first shared gate electrode is electrically connected to the first common scanning signal line, the first shared source electrode is electrically connected to a reset voltage line, and the first shared drain electrode is electrically connected to the third drain electrode;

the sixth transistor comprises a sixth gate electrode, a sixth source electrode and a sixth drain electrode, the sixth gate electrode is electrically connected to the first drain electrode, the sixth source electrode is electrically connected to a first electrode of the light-emitting device, and the sixth drain electrode is electrically connected to the fifth source electrode and the third source electrode; and the first capacitor comprises a first capacitor electrode and a second capacitor electrode, the first capacitor electrode is electrically connected to the first drain electrode, and the second capacitor electrode is electrically connected to the first electrode of the light-emitting device.

* * * * *